US009512005B2

(12) United States Patent
Inada et al.

(10) Patent No.: US 9,512,005 B2
(45) Date of Patent: *Dec. 6, 2016

(54) METHOD FOR MANUFACTURING CARBONACEOUS FILM AND GRAPHITE FILM OBTAINED THEREBY

(71) Applicant: KANEKA CORPORATION, Osaka (JP)

(72) Inventors: Takashi Inada, Kawasaki (JP); Yasushi Nishikawa, Takatsuki (JP); Makoto Mishiro, Settsu (JP)

(73) Assignee: KANEKA CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,999

(22) Filed: Sep. 5, 2014

(65) Prior Publication Data

US 2015/0054187 A1 Feb. 26, 2015

Related U.S. Application Data

(62) Division of application No. 13/063,419, filed as application No. PCT/JP2009/004524 on Sep. 11, 2009, now Pat. No. 8,858,847.

(30) Foreign Application Priority Data

Sep. 11, 2008 (JP) ................................. 2008-233557
Oct. 28, 2008 (JP) ................................. 2008-276202

(51) Int. Cl.
*C01B 31/02* (2006.01)
*C01B 31/04* (2006.01)

(52) U.S. Cl.
CPC ............... *C01B 31/02* (2013.01); *C01B 31/04* (2013.01)

(58) Field of Classification Search
USPC ....................................................... 264/29.1
See application file for complete search history.

(56) References Cited

U.S. PATENT DOCUMENTS 4,915,984 A 4/1990 Murakami
5,443,859 A 8/1995 Nagata
(Continued)

FOREIGN PATENT DOCUMENTS

EP 0397152 11/1990
JP 61-275116 12/1986
(Continued)

OTHER PUBLICATIONS

Abstract of JP 61-275117 (published Dec. 5, 1986), Patent Abstracts of Japan.
(Continued)

*Primary Examiner* — Yogendra Gupta
*Assistant Examiner* — Kimberly A Stewart
(74) *Attorney, Agent, or Firm* — Kagan Binder, PLLC

(57) ABSTRACT

In a method for producing a carbonaceous film in which a polymer film is wrapped around a core and is subjected to a heat treatment, material film surfaces during the carbonization step are prevented from fusion, whereby a long carbonaceous having a large area film is obtained.
Fusion can be prevented by subjecting a polymer film to a heat treatment under a reduced pressure, and under a reduced pressure while allowing an inert gas to flow. The range of the pressure reduction is preferably −0.08 MPa to −0.01 kPa. It is preferred to carry out carbonization with the pressure reduced in the range of from −0.08 MPa to −0.01 kPa while allowing an inert gas to flow. In addition, the polymer film wrapped around the core is placed in an outer casing, and provided that a value derived by dividing (internal diameter of the outer casing−diameter of the core) by 2 is designated as "a" (mm), and a thickness of wrapping of the polymer film is designated as "b" (mm), a value (b/a) derived by dividing the "b" by the "a" is set to fall within the range of from 0.2 to 0.9.

18 Claims, 9 Drawing Sheets

(56) References Cited

U.S. PATENT DOCUMENTS

| | | | |
|---|---|---|---|
| 6,632,849 B1 | 10/2003 | Yao et al. | |
| 2001/0038438 A1* | 11/2001 | Beeloo | B29C 51/10 351/159.56 |
| 2008/0014426 A1* | 1/2008 | Nishikawa | C01B 31/04 428/220 |
| 2008/0050305 A1 | 2/2008 | Nishikawa et al. | |

FOREIGN PATENT DOCUMENTS

| | | | |
|---|---|---|---|
| JP | 61-275117 | 12/1986 | |
| JP | 63-256508 | 10/1988 | |
| JP | 05-132360 | 5/1993 | |
| JP | 2006-044999 | 2/2006 | |
| JP | 2006-327907 | * 12/2006 | C01B 31/04 |
| JP | 2008-024571 | 2/2008 | |
| JP | 2008-207967 | 9/2008 | |

OTHER PUBLICATIONS

Abstract of JP 63-256508 (published Oct. 24, 1988), Patent Abstracts of Japan.
Abstract of JP 05-132360 (published May 28, 1993), Patent Abstracts of Japan.
Abstract of JP 2008-024571 (published Feb. 7, 2008), Patent Abstracts of Japan.
Abstract of JP 2008-207967 (published Sep. 11, 2008), Patent Abstracts of Japan.
Hirose, Yoshiaki, "Expanded Graphite Sheet Application and New Development," Japan Society for the Promotion of Science, Carbon Materials 117$^{th}$ Committee, p. 322-327.
International Search Report of PCT/JP2009/004524.
Search Report, State Intellectual Property Office of the People's Republic of China, CN Application No. 200980135947.0, mailed Sep. 9, 2013, w/English translation.

* cited by examiner (a)      (b)      (c)

(a)　　　　　(b)　　　　　(c)

METHOD FOR MANUFACTURING CARBONACEOUS FILM AND GRAPHITE FILM OBTAINED THEREBY

This application is a divisional of U.S. application Ser. No. 13/063,419, which was filed on Mar. 10, 2011, which in turn is a national stage entry of International Application No. PCT/JP2009/004524, which was filed on Sep. 11, 2009, which in turn claims priority to Japanese Application No. 2008-276202, which was filed on Oct. 28, 2008, and Japanese Application No. 2008/233557, which was filed on Sep. 11, 2008, wherein the entireties of said patent applications are incorporated herein by reference.

TECHNICAL FIELD

The present invention relates to a method for producing a carbonaceous film used as a heat dissipation member in electronic instruments, precision instruments, and the like.

BACKGROUND ART

Graphite has been extensively used as thermal diffusion/heat dissipation materials, heat resistant sealing materials, gaskets, separators for fuel cells and the like due to having excellent heat resistance, chemical resistance, thermally conductive properties and electrically conductive properties, and low permeability of gasses. Graphite has thermal and electrical properties that greatly differ between those along the a-b plane direction and the c-axis direction. More specifically, anisotropy of the thermal conductivity in the directions along the a-b plane and the c-axis reaches 50 to 400 times. Heat dissipation films of graphite are employed for allowing thus generated heat to be diffused quickly over a large area taking advantage of such properties. Exemplary methods for producing graphite used in applications of heat dissipation include the following two methods.

One is generally referred to as an expanded graphite method. In this method, expanded graphite, which is yielded when an intercalation compound is formed by treating natural graphite lead with a strong acid such as sulfuric acid and subjected to heating and expansion, is rolled to obtain a graphite film in the form of a sheet (hereinafter, the graphite film produced by this method will be herein referred to as "expanded graphite film") (Nonpatent Document 1).

Such an expanded graphite film exhibits a thermal conductivity of about 100 to 400 W/(m·K) in directions along the plane, and used as a heat dissipation material. Such an expanded graphite film used for a heat dissipation material is advantageous in ease in production of a sheet having a large area; however, to the contrary, it is disadvantageous in that to achieve a thermal conductivity of 400 W/(m·K) or more is difficult and to produce a thin film having a thickness of 50 μm or less is difficult.

Another method is a polymer thermal decomposition method in which a film of a polymer such as polyoxadiazole, polybenzothiazole, polybenzobisthiazole, polybenzooxazole, polybenzobisoxazole, polythiazole, polyimide, polyphenylenevinylene, or polyimide is subjected to a heat treatment in an inert atmosphere such as argon or helium, or under vacuum (Patent Documents 1, 2 and 3). According to this method, a graphite film is obtained via two steps of: a carbonization step of preheating the polymer film in, e.g., an inert gas, preferably a nitrogen gas at about 1,000° C. to prepare a glassy carbonaceous film; and a graphitization step of thereafter subjecting thus prepared carbonaceous film to a treatment at a temperature of 2,400° C. or more. When viewed as a heat dissipation material, the polymer graphite film is advantageous in exhibiting extremely high thermal conductivity of 600 to 1,800 W/(m·K), being capable of providing a thin sheet and also capable of easily producing a sheet having a thickness of 25 μm or less, whereas it is disadvantageous in difficulty of producing a sheet having a large area.

The following two methods have been known as exemplary method for producing a graphite film by way of the polymer thermal decomposition method:

(Method 1) a method in which a sheet of a material film is sandwiched between graphite plates and subjected to a heat treatment; and (Method 2) a method in which a long material film is wrapped around a circular cylinder and subjected to a heat treatment.

These methods are explained in more detail as in the following.

(Method 1) Method in which a Sheet of a Material Film is Sandwiched between Graphite Plates and Subjected to a Heat Treatment Examples 1 and 2 of Patent Documents 1 and 2 disclose a method in which a material film in the form of a sheet is subjected to a heat treatment as follows. A film of PA (poly(m-phenyleneisophthalamide)), PI (poly(pyromellitic imide)), PBI (poly(m-phenylenebenzoimidazole)) or PBBI (poly(m-phenylenebenzobisimidazole)) having a thickness of 25 micron is fixed in a stainless frame, and subjected to a preliminary heat treatment using an electric furnace from room temperature to 700° C. at a rate of 10° C. per minute in argon. Since the film of PA shrinks to 50% of the Original dimension in this temperature range when there is no stainless frame provided, fixation with a stainless frame means that preheating treatment was carried out while applying a tension, as a consequence. The film preheated in this manner is sandwiched with graphite plates, followed by elevating the temperature thereof at a rate of 10° C. per minute in an argon stream, and subjected to a heat treatment at a desired temperature (Tp) for 1 hour. Subsequently, the film is cooled after the heat treatment at a rate of temperature fall of 20° C. per minute. The furnace used is an electric furnace in which a carbon heater is employed. Thus obtained black film is fragile and does not have flexibility when the Tp is 1,400° C. or less; however, it has flexibility when the Tp is 1,800° C. or more.

(Method 2) Method in which a Long Material Film is Wrapped Around a Circular Cylinder and Subjected to a Heat Treatment Example 1 of Patent Document 3 discloses a method in which a long material film is wrapped around a circular cylinder and subjected to a heat treatment as in the following. A POD film having a width of 180 mm and a thickness of 50 μm is triply wrapped around a graphitous carbon circular cylinder having an external diameter of 68 mm, an internal diameter of 64 mm and a length of 200 mm (i.e., three sheets being overlaid, not one sheet being wrapped around three times), followed by elevating the temperature thereof from room temperature at a rate of 10° C. per minute in an argon stream, and subjected to a treatment at a desired temperature Tp for 1 hour. Thereafter, the temperature is fallen at a rate of 20° C. per minute. The furnace employed may be a 46-6 type carbon heater furnace manufactured by SHINSEI DENRO Ltd. Thus obtained black film is fragile and does not have flexibility when the heat treatment temperature Tp is 1,600° C. or less; however, it has flexibility when the Tp is 1,800° C. or more. The film has a size of 170×180 mm. In addition, a method in which a film that serves as a separator is wrapped around a circular cylinder together with a material film, and a heat treatment is concurrently carried out, for preventing the material film from fusion with one another is proposed in Patent Document 4. Furthermore, Patent Document 4 discloses in the section of Problems to be Solved by the Invention that obtaining a graphite film having a length not shorter than the cylindrical circumference is difficult unless a separator is used.

PRIOR ART DOCUMENTS

Patent Documents

Patent Document 1: JP-A No. S61-275116
Patent Document 2: JP-A No. S61-275117
Patent Document 3: JP-A No. S63-256508
Patent Document 4: JP-A No. H5-132360

Nonpatent Documents

Nonpatent Document 1: EXPANDED GRAPHITE SHEET—APPLICATION AND NEW DEVELOPMENT, Novel development of carbon materials, Japan Society for the Promotion of Science, Carbon Materials 117th Committee, 60-year Anniversary Issue, p. 322-327,

DISCLOSURE OF THE INVENTION

Problems to be Solved by the Invention

Graphite films obtained by the polymer thermal decomposition method have superior thermal conductivity and thinness, and a higher heat dissipation effect as compared with expanded graphite films can be expected with reduced dimension for space saving. Under current circumstances in which reduction in thickness and high density packaging of electronic equipments have been in progress, capability of dissipating heat in an efficient manner even in small spaces is significantly advantageous. However, allowing polymer graphite films to have a still larger area is difficult, and thus use thereof has been limited to a part of small equipments, etc., irrespective of their superior performances. When a conventional polymer graphite film is used in portions of a large area, it has been necessary to laminate multiple pieces of the graphite film for such use. Since thus joined part has a large heat resistance, failure in achieving advantageous high thermal conductivity occurs, and significant disadvantages also in light of the production costs have resulted.

According to a method for obtaining a graphite film by baking a sheet type material film, dimension of producible graphite is limited by inside dimension of a baking space of the furnace employed; therefore, the method has not been suitable for the goal of producing a graphite film having a large area. On the other hand, a method in which a long material film is baked after wrapping around a core is extremely favorable in terms of capability of conveniently obtaining a long graphite film having a large area which is not available with a sheet type. However, such a method of baking carried out with a circular cylinder vessel involves the following problems.

As described above, in order to obtain a graphite film by baking the polymer film, the film is obliged to become a glassy carbonaceous film state having extremely inferior mechanical strength during a step of its production. In this carbonization step, the film shrinks to a length of about 60 to 80% of the original material film. Increase in the number of times of wrapping around the core for obtaining a long graphite film results in significant problems that the film is broken concomitantly with shrinkage in the carbonization step, or that the films are fused with each other. Once fused, such a carbonaceous film does not restore even in the following graphitization step, and as a result, a broken graphite film, or a graphite film accompanied by very wrong surface conditions may be obtained. From the foregoing reasons, the length of a graphite film which can be produced in the state being wrapped around a core has been limited.

Moreover, the method proposed in the aforementioned Patent Document 4 (JP-A No. H5-132360) is a method in which a heat treatment is carried out by cylindrically wrapping the material film together with a separator film for the purpose of preventing the material film from being broken and fused. However, since this method requires using a separator having the same area as that of the material film, production efficiency of the carbonaceous film is enormously deteriorated. For example, when a separator having the same thickness as the material film is used, the throughput of the material film which can be treated in a certain volume is reduced by about half. The reduction of the throughput by half means that the continuous length of processable material film is reduced by half. Thus, advantages of the cylindrical type that enables production of long films are not achieved. It should be noted that Patent Document 4 discloses possibility of obtaining a graphite film also from a separator, it is impossible to obtain a favorable graphite film from a separator that contains additives in effect.

Means for Solving the Problems

As a result of various investigations, causes of fusion were found to involve carbonization and sticking of gasses generated by decomposition from the wrapped material film and failed to be discharged outside the system. Accordingly, for the purpose of removing the decomposition gas quickly outside the system, a carbonization treatment under vacuum condition was studied.

A first aspect of the present invention provides a method for producing a carbonaceous film characterized in that the method includes producing a carbonaceous film by way of a carbonization step in which a polymer film is subjected to a heat treatment under the condition that the polymer film is wrapped around a core, wherein at least a part of the carbonization step is carried out under a reduced pressure. Herein, the expression "at least a part of the carbonization step is carried out under a reduced pressure" means that the pressure of a gas in a heating apparatus (may be also referred to as "furnace") is reduced to lower than the pressure outside the heating apparatus during at least a part of the carbonization step.

A second aspect of the present invention provides the method for producing a carbonaceous film characterized in that the range of the pressure reduction is from −0.01 kPa to −0.08 MPa.

A third aspect of the present invention provides the method for producing a carbonaceous film characterized in that the pressure reduction is carried out within a range of the temperature at which carbonization and thermal decomposition occur.

A fourth aspect of the present invention provides the method for producing a carbonaceous film characterized in that the pressure reduction is carried out within a temperature range of from 500° C. to 700° C.

A fifth aspect of the present invention provides the method for producing a carbonaceous film characterized in that the carbonization is carried out under a reduced pressure within the range of from −0.01 kPa to −0.08 MPa while supplying an inert gas.

A sixth aspect of the present invention provides the method for producing a carbonaceous, film characterized in that provided that the volume of a treated substance is designated as V (L), and the amount of the inert gas supplied is designated as V1 (L/s), a value V/V1 (s) is 0.01 or more and 1,000 or less.

A seventh aspect of the present invention provides the method for producing a carbonaceous film characterized in that the heat treatment is carried out with the core being transversely situated.

An eighth aspect of the present invention provides the method for producing a carbonaceous film characterized in that the polymer film has a thickness of 10 μm or more and 250 μm or less.

A ninth aspect of the present invention provides the method for producing a carbonaceous film characterized in that the polymer film has a length of 10 m or more.

A tenth aspect of the present invention provides the method for producing a carbonaceous film characterized in that the core has a diameter of 70 mm or more.

An eleventh aspect of the present invention provides the method for producing a carbonaceous film characterized in that a vessel including the core, and an outer casing for housing the core is provided, and the vessel has a ventilating property.

In addition, it was revealed that causes of breaking and fusion of a carbonaceous film involve inhibition of shrinking of the film along the longitudinal direction due to wrinkles and ruffling generated in the film during the carbonization. It was found that the wrinkles of the film and shrinkage of the ruffled film can be prevented by providing a constraining means upon expansion and shrinkage of the polymer film, for constraining the outer circumferential end of the polymer film wrapped around the core. It was also found that the outer circumferential end of the polymer film can be constrained by using as the constraining means, for example, a vessel that includes an outer casing and a core, and adjusting the internal diameter of the outer casing and the diameter of the core, whereby carbonization of a long film can be performed without occurrence of wrinkles and ruffling.

A twelfth aspect of the present invention provides a method for producing a carbonaceous film characterized in that the method includes producing a carbonaceous film by way of a carbonization step in which a polymer film is subjected to a heat treatment under the condition that the polymer film is wrapped around a core, wherein a constraining means for constraining the outer circumferential end of the polymer film upon expansion and shrinkage of the polymer film in the carbonization step is used.

A thirteenth aspect of the present invention provides the method for producing a carbonaceous film characterized in that at least a part of the carbonization step is carried out under a reduced pressure.

A fourteenth aspect of the present invention provides the method for producing a carbonaceous film characterized in that: a vessel having the core and an outer casing is further used; the constraining means is the outer casing; and provided that a value derived by dividing (internal diameter of the outer casing−diameter of the core) by 2 is designated as "a" (mm), and a thickness of wrapping of the polymer film is designated as "b" (mm), a value (b/a) derived by dividing the "b" by the "a" falls within the range of from 0.2 to 0.9.

A fifteenth aspect of the present invention provides the method for producing a carbonaceous film characterized in that the value (b/a) falls within the range of from 0.5 to 0.8.

A sixteenth aspect of the present invention provides the method for producing a carbonaceous film characterized in that the value (b/a) falls within the range of from 0.3 to 0.7.

A seventeenth aspect of the present invention provides the method for producing a carbonaceous film characterized in that the outer casing has a structure obtained by cutting out to remove a circular cylindrical shape from a columnar body.

An eighteenth aspect of the present invention provides the method for producing a carbonaceous film characterized in that at least a part of the outer casing is provided with one or more holes for ventilation.

A nineteenth aspect of the present invention provides the method for producing a carbonaceous film characterized in that the polymer film is subjected to a heat treatment with the core being transversely situated.

A twentieth aspect of the present invention provides the method for producing a carbonaceous film characterized in that the polymer film has a thickness of 10 μm or more and 250 μm or less.

A twenty first aspect of the present invention provides the method for producing a carbonaceous film characterized in that the polymer film has a length of 10 m or more.

A twenty second aspect of the present invention provides the method for producing a carbonaceous film characterized in that the diameter of the core is 70 mm or more.

A twenty third aspect of the present invention provides the method for producing a carbonaceous film characterized in that only one type of a polymer film is used without using a separator film.

A twenty fourth aspect of the present invention provides the method for producing a carbonaceous film characterized in that the range of the pressure reduction is from −0.01 kPa to −0.08 MPa.

A twenty fifth aspect of the present invention provides the method for producing a carbonaceous film characterized in that an indirect heat treatment is carried out by maintaining the polymer film wrapped around the core in a heater.

A twenty sixth aspect of the present invention provides a graphite film obtained by subjecting the carbonaceous film produced by any one of the aforementioned methods for producing a carbonaceous film to a treatment at 2,400° C. or more.

Effects of the Invention

According to the present invention, fusion of material films with each other in the carbonization step is prevented, and thus obtaining a long carbonaceous film having a large area with favorable productivity is enabled. The obtained carbonaceous film can be easily converted into a high quality graphite film using a known technique. By using the method of the present invention, a long graphite film having a large area, which has been difficult to produce, can be easily produced.

In addition, the aforementioned Patent Document 4 (JP-A No H5-132360) discloses that obtaining a graphite film having a length not shorter than the cylindrical circumference is difficult unless other film is used as a separator; however, the production method of the present invention enables a long graphite film having a large area to be easily produced. It should be noted that the aforementioned Patent Document 3 (JP-A No. S63-256508) discloses to sandwich a polymer film between two bodies of cylindrical graphitous carbon, but the construction and effects of the constraining means according to the present invention have not been suggested.

Figure 1:
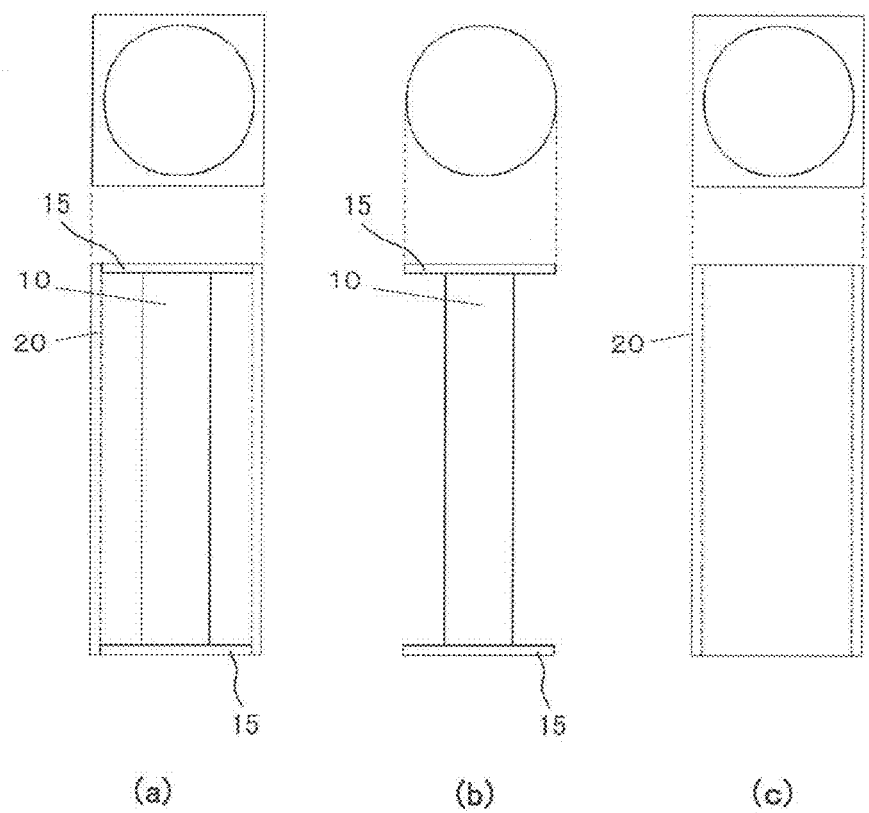
FIG. 1 shows a schematic view illustrating one example of a vessel according to the present invention.

PREFERRED MODE FOR CARRYING OUT THE INVENTION (Polymer Film)

The polymer film which can be used in the present invention is not particularly limited, but is exemplified by polyimide (PI), polyamide (PA), polyoxadiazole (POD), polybenzooxazole (PBO), polybenzobisoxazol (PBBO), polythiazole (PT), polybenzothiazole (PBT), polybenzobisthiazole (PBBT), polyparaphenylenevinylene (PPV), polybenzoimidazole (PBI) and polybenzobisimidazole (PBBI), and the polymer film is preferably a heat resistant aromatic polymer film including at least one selected from these, since the thermally conductive properties of the graphite finally obtained can be superior. These films may be produced by a well-known producing method. Of the polymers, polyimide is preferred since products having a variety of structures and properties can be obtained by selecting the material monomer variously. In addition, polyimide films are likely to result in graphite having superior crystallinity and excellent thermally conductive properties, since carbonization and graphitization of the film proceed more readily than polymer films produced from other organic material as a material.

(Regarding Degree of Pressure Reduction)

When the polyimide film is subjected to a treatment at a temperature up to 1,000° C. in an inert gas, decomposition gradually starts from about 500° C., and the shrinkage of the film almost proceeds at a temperature between 500 to 700° C. at which the decomposition gas is generated, whereas the shrinkage of the film hardly occurs at 700° C. or higher. Low molecular gasses such as carbon monoxide, carbon dioxide, nitrogen and ammonia, as well as low molecular organic matter such as benzene, aniline, phenol and benzonitrile are observed as decomposition gasses. When the temperature is elevated to about 900° C., generation of these decomposition gasses almost reaches plateau, and finally a carbonaceous film having a weight decreased to about 60% is obtained after treating at a temperature up to 1,000° C. In addition to the components described above, a large number of substances having a low molecular weight that can be hardly identified are observed, and these organic matter components are recovered after the carbonization treatment as nonvolatile tar components.

The tar components exist in the state of gas or fine spray immediately after generation as a decomposition gas from the film. When the film is in close contact with other film, in other words, in the state in which the material film is wrapped around the core, the gas may be retained between the films. Gas components retained between the films are aggregated to produce tar, and the tar serves as an adhesive and hardens on its own as the temperature rises, thereby causing fusion. In order to suppress aggregation of the gas components, a carbonization treatment in an atmosphere having reduced pressure may be carried out. By carrying out the carbonization treatment under a reduced pressure, aggregation of the decomposition gas is prevented and enables occurrence of fusion to be significantly suppressed. Greater suppressing effect is achieved as the degree of pressure reduction is higher. For example, when a carbonization treatment is carried out by sandwiching a polyimide film having a great width between graphite plates, a step for allowing the gas to escape is lengthened as compared with the case of a polyimide film having a small width; therefore, increase of tendency of causing fusion is expected. Also in such a case, occurrence of fusion can be suppressed by carrying out the carbonization treatment with further increased degree of pressure reduction. On the other hand, in order to obtain a graphite film having superior capability of thermal diffusion, it is necessary to orient graphite to give layers in the graphitization step. In order to obtain a favorable graphite film having such uniform graphite layers, it is preferred in the carbonization step that is a preceding step of the graphitization step that the carbonization treatment is allowed to proceed gently, thereby permitting development and orientation of the carbon plane to some extent following the carbonization treatment. Thus, although yet more gasses are generated from inside the film when the degree of pressure reduction is increased, excessively increased degree of pressure reduction is more likely to result in a carbonaceous film having a partially broken plane structure of carbon, and to control the degree of pressure reduction to a certain level is effective.

The range of the pressure reduction in the present invention is acceptable when it is −0.01 kPa or more, which is preferably −0.01 kPa or more and −0.08 MPa or less, more preferably −0.1 kPa or more and −0.06 MPa or less, and still more preferably −0.5 kPa or more and −0.04 MPa or less. When the degree of pressure reduction is −0.01 kPa or more, the effect of suppressing fusion is sufficiently achieved, whereas a graphite film having favorable thermal diffusivity can be obtained when the degree of pressure reduction is −0.08 MPa or less. The expression of the "pressure reduction being −0.01 kPa" as herein referred to means that the gas pressure in the heating apparatus is lower than the gas pressure outside the heating apparatus (generally, deemed to be "ambient pressure") by 0.01 kPa. Similarly, the expression of the "pressure reduction being −0.08 MPa" as herein referred to means that the gas pressure in the heating apparatus is lower than the gas pressure outside the heating apparatus by 0.08 MPa.

In addition, the pressure reduction may be carried out in the entire temperature range of the carbonization step, but the lower limit of the temperature range when the pressure reduction is carried out is preferably 400° C., and more preferably 500° C., whereas the upper limit of the temperature range when the pressure reduction is carried out is preferably 800° C., and more preferably 700° C. It is particularly preferred to carry out the pressure reduction in the range of the temperature at which carbonization and thermal decomposition occur, or 500° C. to 700° C. By carrying out the pressure reduction in the range of the temperature at which the decomposition gas is generated in a large quantity, retention of the decomposition gas between the films can be effectively prevented, and as a result, suppression of fusion is enabled. Moreover, since glassy and fragile state is yielded as carbonization proceeds, this fragile state is likely to be accompanied by breakage when some force is applied thereto. Thus, a film having less breakage can be obtained by subjecting to a mild heat treatment at ordinary pressure or low degree of pressure reduction in the temperature range after the carbonization and thermal decomposition proceeded. In addition, when the ordinary pressure or compressed state is switched into a pressure-reduced state during the heat treatment, the gas retained between the films is aspirated outside the system due to the reduced pressure and at the same time pushed out by the gas that had filled in the furnace. Therefore, by switching to pressure-reduced state in the range of the temperature at which more gas is emitted by carbonization and thermal decomposition, the fusion can be more effectively prevented.

(Supply of Inert Gas)

As the number of times of wrapping around the core increases, adhesiveness between the films is enhanced to increase the likelihood of occurrence of fusion during the carbonization treatment. In particular, fusion is more likely to occur at parts close to the core since stronger force is imparted thereto as compared with the external side part. When a polyimide film having a certain length or longer is treated, fusion is more likely to occur. In such a case, to prevent fusion more efficaciously is enabled by supplying an inert gas concurrently with carrying out the treatment under a reduced pressure. The decomposition gas retained between the films can be more quickly removed outside the system by supplying the inert gas from one end of the baking section and concurrently discharging from another end to generate a channel of the inert gas in the baking section. In this process, it is important to adjust flow rate V1 (unit: L/s) of the inert gas and discharge volume V2 (unit: L/s) of gas to maintain an appropriate pressure reduction condition inside the furnace. The effect is more superior as the amount of the inert gas supplied is larger, but increase in the amount of the inert gas used is not preferred due to increase of the cost. Provided that the volume of the treated substance is designated as "V", the volume V of the treated substance and the amount of the required inert gas can be represented by a proportional relationship. The volume V of the treated substance as referred to herein represents a total volume of the entire members disposed in the heating apparatus and heated, such as the polyimide film treated, the vessel of the polyimide film, and the like. A value V/V1 (unit: s) derived by dividing the volume V of the treated substance by the flow rate V1 of the inert gas is preferably 0.01 or more and 1,000 or less, more preferably 0.1 or more and 100 or less, and still more preferably 1 or more and 10 or less. The value V/V1 being less than 0.01 is not desired since the amount of the inert gas supplied is too large relative to the treated substance. Moreover, when the value V/V1 is greater than 1,000, it is probable that the fusion cannot be prevented satisfactorily due to too small amount of the inert gas. Herein, the "flow rate V1 of the inert gas" as referred to means a rate (L/s) of supplying the inert gas at the gas pressure outside the heating apparatus (generally, deemed to be "ambient pressure").

The type of the inert gas used may include nitrogen, argon, helium, and the like. Any gas may be used without affecting the film during the carbonization treatment, as long as it is the inert gas as described above, and the same quality can be achieved. Among these, nitrogen is preferably used in light of the cost.

In connection with the atmospheric conditions, it is not necessary to carry out the treatment under the aforementioned atmospheric condition during the carbonization treatment, and the atmospheric condition may be provided at least at about 400 to 750° C. at which the decomposition gas is generated in the largest quantities, and preferably at about 400° C. to 700° C. By allowing the inert gas to flow in the range of the temperature at which the decomposition gas is generated, retention of the decomposition gas between the films can be effectively prevented, and as a result prevention of the fusion is enabled. Typical methods include, for example: a method in which the treatment is carried out under a reduced pressure without supplying an inert gas to a temperature of about 400° C., and thereafter a certain degree of pressure reduction is maintained while supplying the inert gas; or a method in which the treatment is carried out with a reduced flow rate of the inert gas after the temperature reached to 700° C. According to such methods of treatment, necessity of constantly allowing the inert gas to flow during the treatment can be avoided, and thus reduction in amount of consumption of the inert gas is enabled.

It can be assumed that when a large number of sheets of a polyimide film are subjected to the treatment, an ordinary pressure or compressed state may be provided temporarily in the furnace during generation of the gas. Estimating the amount of the decomposition gas and keeping the treatment atmosphere in the state of reduced pressure as far as possible will be also an important factor for remedy of contamination and fusion. Therefore, in order to further ensure achieving the effects of the invention, it is preferred to optimize an inert gas channel in the furnace. It is still more effective to design the supply port and emission port of the inert gas to be suited to the baking section and the shape of the vessel used for baking, and to form into a structure of the vessel per se for receiving the polyimide film to have favorable ventilating property.

(Regarding Film Thickness)

As the thickness of the material polyimide film increases, the amount of the decomposition gas generated during the carbonization treatment increases and thus fusion is more likely to occur. Ability of thermal diffusion of a graphite film per se is represented by thermal conductivity (unit: W/(m·K)), but ability of transporting heat in effect is represented by a marker that is a value derived by multiplying this value of thermal conductivity by the thickness of the graphite film. For example, even in the case of graphite films having the same thermal conductivity in the plane direction of 1,000 W/(m·K), when the films have a thickness of 40 μm and 25 μm, a 40-μm graphite film will have more superior ability of heat transport than a 25-μm graphite film. In other words, when used with an identical area, the graphite film having a thickness of 40 μm is more likely to diffuse heat from a heat source. In light of demands for transport of heat in a large quantity with a minimum area, production of a thick graphite film is extremely useful.

In general, when a film having a large finished thickness is produced by a polymer graphite method, it is necessary to use a polyimide film having a large thickness as a material. As described above, polyimide films having a large thickness are more likely to cause fusion in a carbonization treatment. In order to solve such problems, for example, a separator (i.e., a sheet or film sandwiched between material films such as, for example, a graphite film or a graphite plate) may be also used. Furthermore, since the length of a polyimide film having a large thickness which can be treated within an identical volume is decreased in comparison with a thinner film, it is preferred not to use a separator or the like sandwiched between the films as one can. By using the carbonization method of the present invention under a reduced pressure, a carbonization treatment is enabled without using a separator, even in the case of polyimide film having a large thickness. Also in this case, pressure reduction in the carbonization treatment carried out while allowing an inert gas to flow is extremely effective. When a polyimide film having a large thickness is subjected to the treatment, the inert gas may be allowed to flow at a higher rate as compared with the case in which a thinner film is treated.

The thickness of the polymer film used in the present invention is preferably 10 μm or more and 250 μm or less, more preferably 20 μm or more and 200 μm or less, further preferably 20 μm or more and 100 μm or less, more preferably 30 μm or more and 150 μm or less, and most preferably 30 μm or more and 80 μm or less. When the polymer film has a thickness of 10 μm or more, sufficiently superior thermal diffusion ability of the finished graphite film is achieved. In addition, when the thickness is 250 μm or less, formation of a highly oriented graphite layer is enabled. In light of control of fusion of the films, the thickness of the polymer film is preferably 10 μm to 100 μm, more preferably 10 μm to μm, still more preferably 10 μm to 60 μm, and particularly preferably 10 μm to 50 μm.

(Length of Material Film)

The method for producing a graphite film including wrapping a polymer film around a core of the present invention is advantageous in that a long graphite film having a large area can be produced which is difficult to produce with a sheet type. However, the area of the material film which can be treated within an identical volume may be decreased as compared with the sheet type, unless a polymer film having a certain length is used. The length of the material film for use in this regard is preferably 10 m or more, more preferably 20 m or more, and still more preferably 50 m or more. Moreover, as the length of the film that is wrapped around a core increases, fusion of the material films is likely to occur during the carbonization treatment as a matter of course, and the production method of the present invention serves more efficaciously in such cases.

(Regarding Discharging Process)

With regard to discharging process, any known process such as a process in which a vacuum pump or discharging fan is used may be employed as long as the baking furnace per se is maintained not to deteriorate its safe state. In particular, a vacuum pump is suitably used in the present invention since a variety types are commercially available, and operation in the process is convenient. Exemplary vacuum pump which may be used in the pressure range of from −0.01 kPa to −0.08 MPa according to the present invention includes an aspirator (water-jet pump), a dry vacuum pump, a mechanical booster pump, an oil-sealed rotary pump, a sorption pump, an oil ejector pump, and the like. For adjusting the degree of pressure reduction, a valve may be attached to an exhaust part of the vacuum pump, and the gas-discharge volume may be regulated. Herein, the expression "pressure −0.01 kPa" means that the pressure is reduced by 0.01 kPa with a vacuum pump, and the expression "pressure −0.08 MPa" means that the pressure is reduced by 0.08 MPa with the vacuum pump.

(Regarding Treatment of Emitted Gas)

Since the decomposition gas of the polyimide film includes various substances having a low molecular weight in addition to the components described above, and thus these substances are yielded as nonvolatile tar matter when the polyimide film is subjected to a carbonization treatment. When a large number of sheets of a polyimide film are carbonized at once, treatment of thus generated tar can be problematic. Taking into consideration that many of tar components are toxic and lead to necessity for labor of cleaning and a risk for human bodies, it is necessary to efficiently treat the emitted gas. In addition, deterioration may be promoted when continuous operation is conducted while tar is adhered on the heater or heat insulating material. Accordingly, it is necessary to introduce the decomposition gas, which was generated during the carbonization treatment, outside the furnace immediately after the generation. In such cases, for successfully introducing the emitted gas outside the furnace, it is preferred to allow an inert gas to flow in the furnace by supplying the inert gas from one end, and discharging the gas from another end. In this manner, the emitted gas generated is quickly discharged outside the furnace, whereby the risk of contamination in the furnace is greatly reduced. In the method of carbonization treatment of the present invention, a treatment of the decomposition gas can be also carried out efficaciously.

(Constrainment of Outer Circumferential End of Polymer Film)

Figure 9:
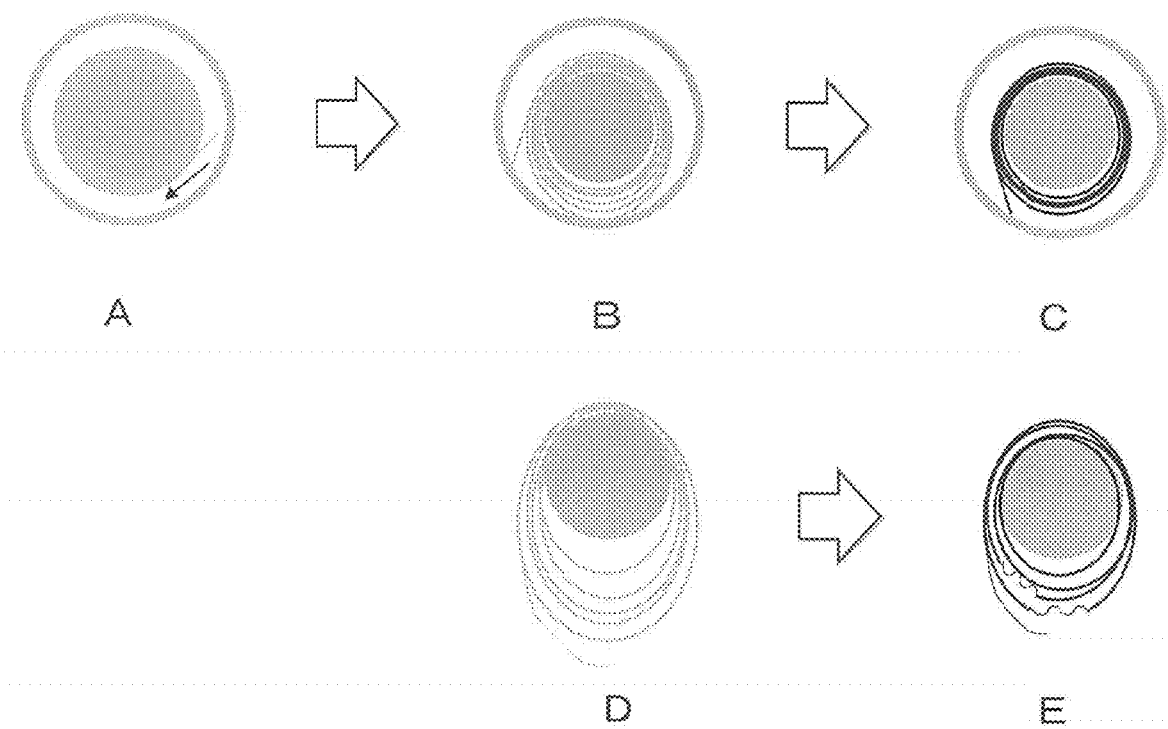
FIG. 9 shows a schematic view for illustrating elongation, and carbonization and shrinkage of a film in the step of elevating the temperature according to the present invention.

When a polymer film such as a polyimide film is subjected to a carbonization treatment at a temperature up to 1,000° C., the polymer film causes linear expansion concomitantly with heating. In the case of a long polymer film, the film is elongated once before carbonization and shrinkage are started by thermal decomposition, as shown in FIG. 9B. For example, when a polyimide film having a length of 50 m is subjected to a heat treatment up to 500° C., the film is elongated by about 1 m. Thus, the polymer film initially wrapped around the core tightly is loosened by elongation at around temperatures at which carbonization and shrinkage occur. When carbonization proceeds thereafter, the film finally shrinks by about 80% of the initial length as shown in FIG. 9C. In the case in which a long polymer film is wrapped around a core and subjected to a carbonization treatment in this manner, the outer circumferential end of the film is loosened in an early stage due to elongation of the film, and becomes pendent down when there is nothing that constrains the outer circumferential end as shown in FIG.

Figure 11:
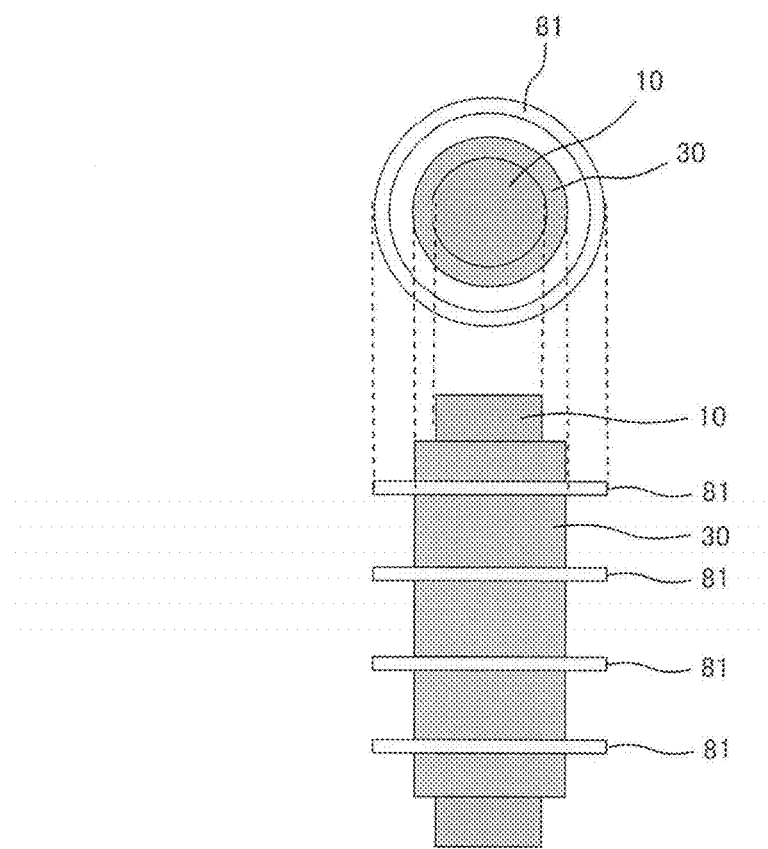
FIG. 11 shows a schematic view illustrating one or multiple ring members that partially surround the outer circumferential face, the ring members being provided as constraining means of the outer circumferential end of a film according to the present invention.
Figure 12:
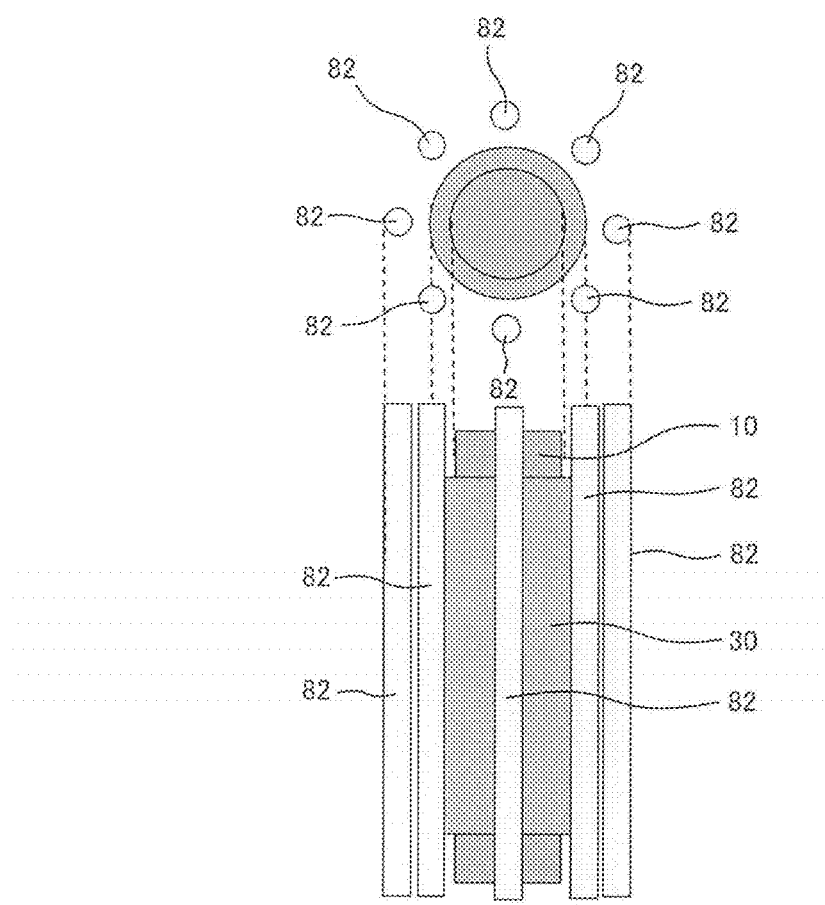
FIG. 12 shows a schematic view illustrating multiple rod-shaped members arranged parallel to the core along the outer circumferential face of a film, the rod-shaped members being provided as constraining means of the outer circumferential end of the film according to the present invention.

9D. Thereafter, the polymer film shrinks as carbonization proceeds. Owing to the shrinkage, the number of times of wrapping of the film is decreased; therefore, the outer circumferential end of the film is situated significantly backward from the outer circumferential face of the wrapped film, and thus the number of times of wrapping is decreased. Accordingly, since the outer circumferential end of the polymer film greatly moves in the step of the carbonization treatment, breakage is likely to be generated, and friction between the films is not created due to failure in close contact between the films. As a result, a carbonaceous film that is broadened from the core and is significantly ruffling at the end is obtained as shown in FIG. 9E. Therefore, when a long polymer film is wrapped around a core and subjected to a carbonization treatment, by constraining the outer circumferential end of the film to the outer circumferential face without hampering the movement thereof, the long carbonaceous film can be obtained as a film accompanied by suppressed breakage and ruffling. As such constraining means of the outer circumferential end of the film, an outer casing that houses the polymer film wrapped around the core, one or multiple ring member(s) 81 partially surrounding the outer circumferential face of film 30 as shown in FIG. 11, multiple rod-shaped members 82 aligned in parallel with core 10 along the outer circumferential face of film 30 as shown in FIG. 12, and the like may be exemplified. Among these constraining means, outer casings having a cylindrical shape are more preferred since uniform constraint is enabled by evenly contacting with the outer circumferential end of the film. Hereinafter, the outer casing will be further explained. It should be noted that the core and the outer casing are inclusively referred to herein as a vessel.

Also, a case in which at least a part of the carbonization step is carried out under a reduced pressure, and the constraining means is provided at the outer circumferential end of the long polymer film is more preferred since fusion of the film can be also suppressed in addition to the breakage and ruffling.

(Regarding Ruffling and Fusion of Film)

Figure 7:
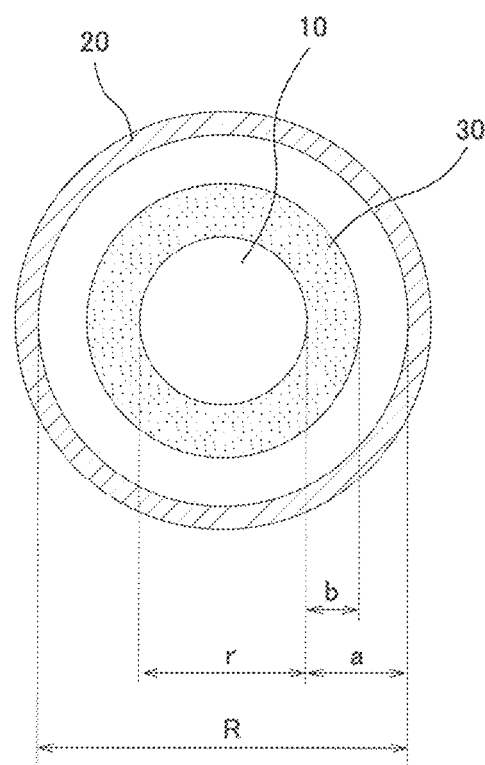
FIG. 7 shows a schematic view illustrating a relationship between "a" and "b" according to the present invention.

As described later, in production of a carbonaceous film, problems of ruffling and fusion of the film are likely to occur. As a method for solving these problems, in the present invention, provided that a value derived by dividing (internal diameter R of the outer casing–diameter r of the core) by 2 is designated as "a" (mm), and a thickness of wrapping of the polymer film is designated as "b" (mm) as shown in FIG. 7, a value (b/a) derived by dividing the "b" by the "a" is an important factor.

In light of prevention of both ruffling and fusion of the carbonaceous film, the value (b/a) is preferably 0.2 to 0.9. When the value is 0.2 or more, a long carbonaceous film free from ruffling and wrinkle can be obtained since the film is supported by the outer casing even when relaxed, and thus the relaxation is less likely to be maintained. When the value is 0.9 or less, a gap for permitting the emitted gas from the film to be escaped is established in the vessel, and fusion of the film surfaces is less likely to occur. The ruffling and the fusion will be explained in more detail below.

<Regarding Ruffling of Film>

When a polyimide film cut to give a size of ×200 mm square is subjected to a heat treatment up to 1,000° C. in the state completely free from fixation, a carbonaceous film accompanied by significant ruffling is obtained. Although this ruffling is removable by subjecting the film to a heat treatment while weighing a certain load from above, it is difficult to obtain a carbonaceous film having a wrinkle-less surface with a sheet type, owing to fine wrinkles generated at the end even in such a case, and the like. On the other hand, with a long type in which a polymer film is wrapped around a core and subjected to a heat treatment, obtaining a long carbonaceous film free from ruffling and wrinkle is enabled by suitably selecting the treatment method. The mechanism will be explained below.

When carbonization of a long material film wrapped around a core is carried out, shrinkage in the longitudinal direction of the film, and friction of film surfaces in the opposite direction with respect to the force of the shrinkage is created. As a result, a certain tension is generated on the film. By the carbonization and shrinkage of the film proceeding while a certain tension is applied, obtaining an extremely flat and long carbonaceous film having a surface free from wrinkle and strain on the film is enabled. As is seen from comparison of B and D, and C and E in FIG. 9, respectively, the film is in contact in some region in B and C provided with a constraining means for constraining the outer circumferential end, and thus these examples are preferred since friction is created in the region being in contact. In the sheet type, even if the carbonization treatment is carried out with the films overlaid, a frictional force does not act between film surfaces during shrinkage, or the vector of the force varies even when a frictional force acts. Thus, a certain level of tension is not generated on the film. In addition, even if the carbonization treatment is carried out while fixing the end of the material film for generating a tension, the carbonaceous film is broken upon shrinking since the film is glassy. Since wrapped films can move with respect to each other during shrinkage in the case with a long type, fracture of the film owing to shrinkage is avoided, and obtaining a carbonaceous film free from wrinkle and ruffling is enabled by an action of a certain level of tension on the film.

When a polymer film such as a polyimide film is subjected to a carbonization treatment up to 1,000° C., the film finally shrinks by about 80% in length as described above; however, since the polymer film causes linear expansion together with heating, the polymer film is elongated once before the thermal decomposition and shrinkage are initiated. For example, when 50 m of a polyimide film having a linear expansion coefficient of 40 ppm/° C. is subjected to a heat treatment up to 500° C., the elongation becomes about 1 m. Thus, the material film initially wrapped around the core tightly is elongated and loosen in the range of the temperature at which carbonization and shrinkage occur. To the contrary, when the polyimide film is wrapped around a cylindrical core and subjected to a heat treatment while being situated transversely, even if the material film is initially wrapped around the core tightly, the film is elongated immediately before occurrence of thermal decomposition and shrinkage and thus the film is relaxed to be pendent down. When the carbonization treatment is allowed to further proceed as is, a frictional force is not created between the film surfaces owing to failure in close contact of the film surfaces. As a result, a long carbonaceous film accompanied by ruffling is obtained. In addition, in the case of a long film, shrinkage of the film in the longitudinal direction is inhibited by wrinkles and ruffling generated during the carbonization. Consequently, film surfaces may cause fracture.

Moreover, after the step of the carbonization treatment, the carbonaceous film is further treated at 2,400° C. or more to convert into a graphite film. The film is foamed as the graphite layer is raised resulting from generation of internal gasses such as: N2 which does not form a graphite skeleton in the final stage of the graphitization step carried out at 2,600° C. or more; and a filler (such as phosphoric acid-based filler) added to the material film. The foamed graphite film following the graphitization treatment is subjecting to a compression treatment, whereby a graphite film that is superior in flex resistance can be obtained. The reason for attaining flex resistance by compressing the foamed graphite film to get rid of the foam is that allowing the strain of the graphite layer imparted upon folding to escape since a small space is present between layers of graphite after compression. However, when there exist ruffling and wrinkles on the carbonaceous film in the step of the carbonization treatment, the ruffling and wrinkles remain unchanged after the graphitization. Therefore, even if a compression treatment is thereafter carried out, ruffling and wrinkles are not resolved, and still deeper wrinkles are formed.

Figure 2:
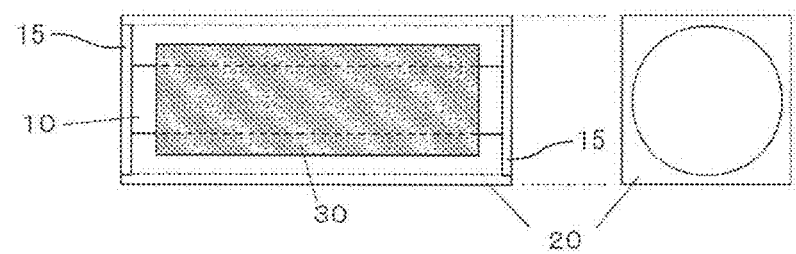
FIG. 2 shows a schematic view illustrating configuration of a vessel and a material film according to the present invention.

Next, carbonization of polymer film 30 carried out using a vessel having core 10 and outer casing 20 as shown in FIG. 2 will be explained. Although the film 30 wrapped around the core 10 elongates and is pendent down before starting shrinkage upon carbonization and thermal decomposition, the pendent parts can be supported by the outer casing 20 when the vessel shown in FIG. 2 is used, and thus carrying out the carbonization while maintaining the wrapped film surfaces in close contact is enabled. A certain tension acts on the film by causing shrinkage of the film while keeping the close contact state, whereby obtaining a carbonaceous film free from ruffling and wrinkle is enabled even if the film is elongated and loosen during the treatment.

In order to support the relaxed film and successfully bring the film surfaces into close contact, it is necessary to adequately select the internal diameter of the outer casing. When the internal diameter of the outer casing is too large, a ruffled film is only obtained since the film is kept relaxing.

When the value (b/a) is 0.2 or more, the relaxed state is less likely to be kept since the film is supported by the outer casing even if relaxed; therefore, a long carbonaceous film free from ruffling and wrinkle can be obtained.

Moreover, in light of ruffling of the carbonaceous film, the value (b/a) is more preferably 0.5 to 0.8. When the value (b/a) is 0.5 or more, the degree of close contact of the film with the outer casing is elevated, and thus a long carbonaceous film free from ruffling and wrinkle can be obtained. When the value (b/a) is 0.8 or less, a flat carbonaceous film without strain can be obtained since the relaxed film is not excessively supported by the contact with the outer casing.

<Regarding Fusion of Film>

As described above, the polyimide film generates a variety of decomposition gasses upon thermal decomposition, These gasses are converted into nonvolatile tar components after the carbonization treatment, and function as an adhesive to allow the film surfaces to be fused. When the polymer film is wrapped around the core and subjected to a carbonization treatment, the film surfaces are brought into close contact, whereby the fusion is likely to occur. In addition, when the number of times of wrapping of the material film is increased for the purpose of obtaining a long carbonaceous film, the fusion is more likely to occur. In general, fusion can be prevented by allowing an inert gas to flow during the treatment as described above to sweep the decomposition gas away. However, in the case in which ventilating property of gas of the whole vessel becomes inferior because the polyimide film per se wrapped around the core is covered with an outer casing as in the present invention, etc., there is possibility of occurrence of fusion of the film surfaces even if the carbonization treatment is carried out while the inert gas is allowed to flow, due to retention of the emitted gas inside the vessel. This problem can be solved by providing a gap for permitting the emitted gas to be escaped into the vessel, in other words, by establishing a sufficiently large internal diameter of the outer casing.

When the value (b/a) is 0.9 or less, a gap for permitting the emitted gas to be escaped from the film is established in the vessel, and fusion of the film surfaces is less likely to occur. Additionally, in light of prevention of the fusion of the carbonaceous film, the value (b/a) is more preferably 0.3 to 0.7. When the value (b/s) is 0.7 or less, a gap for permitting the emitted gas to be escaped from the film is sufficiently established in the vessel, and fusion of the film surfaces is less likely to occur. When the value (b/a) is 0.3 or more, fusion can be prevented that results from contact of significantly ruffled film surfaces caused by excess generation of ruffling of the film since the film is relaxed to lead to failure in successful support by the outer casing.

(Shape of Outer Casing)

Figure 4:
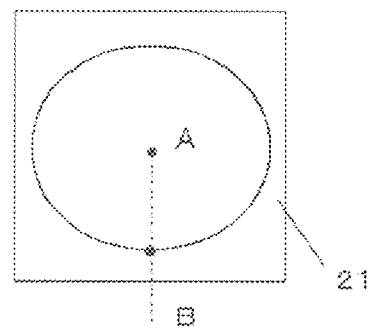
FIG. 4 shows a schematic view illustrating an outer casing according to the present invention.

Although the shape of the outer casing is not particularly limited, the shape of the inner surface is an important factor of deciding the surface of the carbonaceous film since the outer casing supports the relaxed film on the inner surface thereof. Provided that the inner surface of the outer casing has irregularity, the surface of the obtained carbonaceous film may also have irregularity. Also for providing a favorable shape of the carbonaceous film, it is preferred that the inner surface of the outer casing has a shape as approximate as possible to a circular cylindrical shape. However, the shape may not necessarily be a circular cylindrical shape, and an elliptic cylindrical shape is also acceptable. It should be noted that when the shape does not have a circular cross section such as elliptic, a value corresponding to the internal diameter of the outer casing may be determined as the distance between point A and point B, in which the point A is the center of the core, and the point B is the intersection of a perpendicular line from the point A with the outer casing as shown in FIG. 4.

Figure 5:
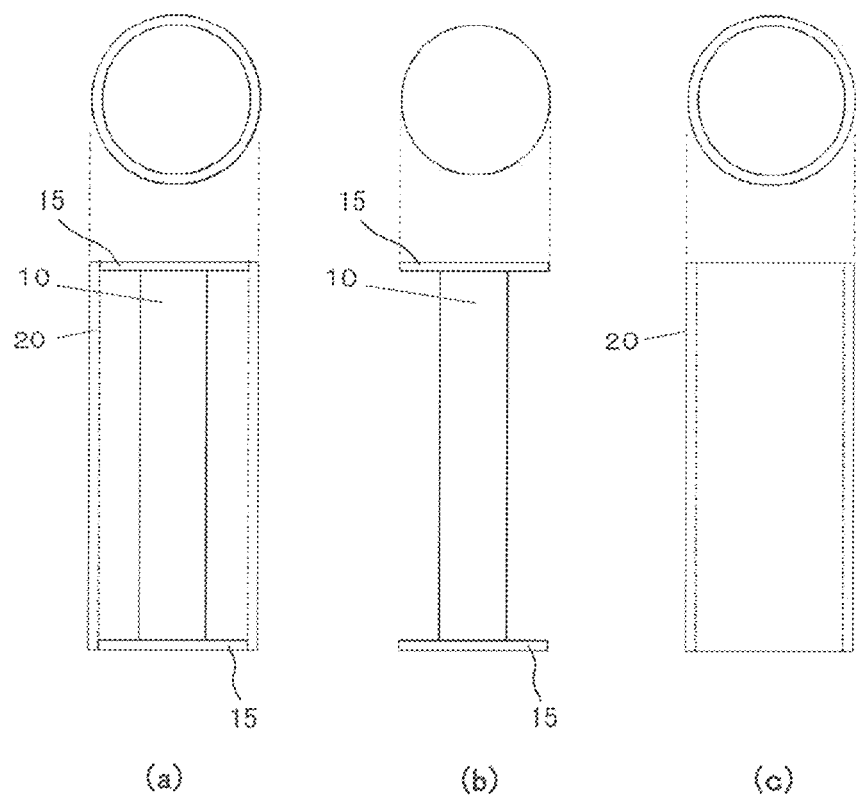
FIG. 5 shows a schematic view illustrating a vessel according to the present invention.

In order to prevent the film surfaces from fusion, to establish a space in the vessel so as to improve escape of the gas is effective by increasing the internal diameter of the outer casing. In this case, it is more preferred to further improve the escape of the gas by additionally providing the outer casing with holes for ventilation. However, the shape of the inner surface of the outer casing may be replicated to the surface of the carbonaceous film. Therefore, when large holes are provided, it is possible that significant irregularity is replicated on the film surface, or the carbonaceous film may be caught and generate breakage. When ventilation holes are provided, replication of irregularity to the film is minimized by decreasing the area of each hole, and the breakage by catching can be prevented. The area is preferably 20 $mm^2$ or less, more preferably 10 $mm^2$ or less, and still more preferably 5 $mm^2$ or less. Although the shape of the holes is not particularly limited, circular is more preferred than square since catching is less frequently caused. In the case of the vessel as shown in FIG. 5, it is desired to provide the ventilation holes in parts where the film will not be brought into direct contact, i.e., the upper part of the outer casing 20 when situated vertically, both side parts of the outer casing 20 when situated transversely (FIG. 2), a part of disc 15 provided as a lid of the outer casing 20, since the film is not affected. In such cases, the area of the holes is not limited since the film will not be caught, and thus the area is preferably as large as possible because more efficient ventilation is executed.

(Regarding Core)

It is necessary that the core has a shape of circular cylinder in the present invention; however, the cross section may not necessarily be a perfect circle, and a somewhat elliptic or distorted circle, or a grooved circle is also acceptable. Since a load applied to the heater increases as the weight of the vessel increases, making a hollow structure inside the core, or further providing the core with fine pores is advantageous in light of decrease in the weight of the whole vessel. Thus making a hollow structure or providing with pores improves ventilating property, and also achieves an effect of efficacious discharge of the emitted gas from the film outside the system.

When carbonization is carried out using a core having a small diameter, followed by a subjecting to a graphitization treatment, a graphite film accompanied by peculiar winding is obtained. A graphite film thus accompanied by peculiar winding is problematic in that wrinkles are more likely to be generated in the following compression and flexibilization step. This problem is solved by using a core having a certain length of diameter, and thus executing flexibilization is enabled without generating wrinkles also in the following compression step. As a method for the flexibilization treatment, a rolling method, a compression method, and the like of the film may be exemplified. In particular, graphite is likely to be cleaved; therefore, in order to obtain a long graphite film not accompanied by variation of the thickness without cleavage, a compression method is preferred. As the compression method in particular, a method in which graphite is sandwiched with particularly polymer films, and planarily compressing the same is preferred. The compression does not impart shearing force as in rolling, and thus enables graphite to be flexibilized without causing cleavage of graphite and occurrence of variation of the thickness.

The diameter of the core is preferably 70 mm or more, more preferably 80 mm or more, and still more preferably 90 mm or more. When the diameter is greater than 70 mm, the obtained carbonaceous film is less likely to be accompanied by peculiar winding. There is no upper limit of the length of the diameter; however, in order to even secure the throughput of the treatment per unit volume, the diameter of the core is preferably 300 mm or less, and more preferably 200 mm or less. In such a case, the space can be effectively utilized by cutting out the core to give a hollow and to further provide a core inside, and thus the throughput which may be subjected to the treatment once can be increased.

(Material of Core)

Requirements for the material of the core which may be used in the present invention include a property of withstanding continuous use in environments of at least 500° C. Examples of the material of the vessel that satisfies the requirements include isotropic graphite materials of extrusion molded articles, molding pressed articles, cold isotropic compressed articles and the like as well as ceramics of alumina ($Al_2O_3$), zirconia ($ZrO_2$), quartz ($SiO_2$), silicon carbide (SiC), titania ($TiO_2$), magnesia (MgO), silicon nitride ($Si_3N_4$), aluminium nitride (AlN), yttria ($Y_2O_3$), mullite ($3Al_2O_3.2SiO_2$), cordierite ($2MgO.2Al_2O_3.5SiO_2$), steatite ($MgO.SiO_2$), forsterite ($2MgO.SiO_2$), etc., and composite materials C/C composites produced by reinforcing graphite with a carbon fiber, and the like. Among these, in light of ease in processing, production cost, and versatility, carbon is suitably used.

There is possibility that ceramics and a part of graphite materials may cause melting, decomposition, or deformation at treatment temperatures (2,400° C. or more) needed in the graphitization step that follows; however, a carbonaceous film once subjected to treatment at 1,000° C. or more does not cause additional ruffling and fusion even if thereafter subjected to a heat treatment again. Thus, after preparing the carbonaceous film, the film may be transferred to other vessel composed of a material that withstands the graphitization temperature, and then the graphitization may be carried out. The graphitization step may be carried out either after taking out the vessel once via a step of lowering the temperature following the carbonization treatment, or without taking out the vessel to continuously carry out graphitization.

(Installation of Vessel in Furnace)

Figure 3:
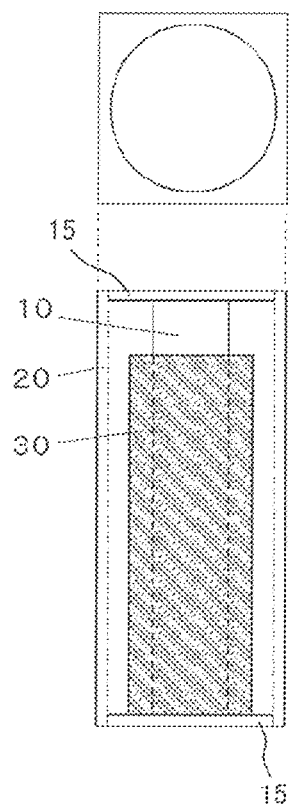
FIG. 3 shows a schematic view illustrating another example of configuration of a vessel and a material film according to the present invention.

For ensuring the effects of the method of carbonization treatment of the present invention, the direction of setting the vessel in the furnace is very important. When heating is executed from the external side of the vessel as in the present invention, in the case in which the vessel is set vertically in the furnace as shown in FIG. 3, for example, the outer casing cannot of course support the relaxed and unrolled material film; therefore, only a ruffled carbonaceous film is obtained. In addition, in the case in which the vessel is situated vertically, heat from the heater is conducted from the bottom part of the vessel; therefore, temperature variation is generated between lower part and upper part of the film, whereby wrinkles and breakage are likely to occur. Furthermore, since escape of the gas emitted from the bottom part of the film becomes difficult, fusion is more likely to occur as compared with the case in which the vessel is transversely situated. On the other hand, when transversely situated, differences of the temperatures in the film are less likely to be generated as compared with the case where vertically situated, and thus wrinkles and breakage are less likely to be generated. Moreover, when the film is set vertically, to breakage may be generated owing to friction created by the film bottom part with the vessel upon shrinkage of the film. Also in the case in which the vessel is transversely situated, it is important to avoid both end parts of the film from being in contact with the vessel as less as possible, in order to inhibit the breakage of the film and to prevent the fusion by facilitating the escape of the emitted gas. From the foregoing, it is preferred to situate the vessel vertically than to situate transversely. Herein, the term "to situate transversely" means a situation in which the core is placed almost horizontally, whereas the term "to situate vertically" means a situation in which the core is placed almost perpendicularly.

In addition, when the vessel is set on a flat face, the external feature of the outer casing having a rectangular solid shape is advantageous in high stability and favorable thermal contact as compared with that of a circular cylindrical shape. However, in the case of the rectangular solid shape, the weight of the vessel tends to become greater in comparison with the circular cylindrical shape and thus load to the heater may be enhanced. In light of workability and reduction in the vessel weight, the outer casing preferably has a circular cylindrical shape.

(Other Points)

When the polyimide film wrapped around the core is directly placed into an electric furnace to be subjected to a carbonization treatment, a carbonaceous film broadened from the core and significantly ruffled at the end part is obtained as described above. When a furnace with a system of permitting heating by electrification of the heater is employed, there is possibility that the broadened film is brought into contact with the heater to result in short circuit. Therefore, it is preferred to carry out the carbonization with the core placed in the outer casing for the purpose of preventing the contact.

EXAMPLES

Hereinafter, the present invention will be explained in more detail by way of Examples and Comparative Examples. It is to be noted that the flow rate of nitrogen stream in Examples and Comparative Examples indicates the flow rate of nitrogen gas at an ambient pressure, outside the electric furnace.

<Evaluations>

(Fusion)

Fusion was evaluated as: "a lot present" when fusion occurred in the entirety; "somewhat a lot present" when fusion occurred in the range of at least 20 layers; "present" when fusion occurred in the range of at least 10 layers; "a few present" when fusion occurred in the range of 5 or less layers; "slightly present" when fusion occurred in the range of 3 or less layers; "hardly present" when fusion occurred in the range of 3 or less layers, which were detachable by hand; and "absent" when no fusion occurred.

(Ruffling)

Figure 10:
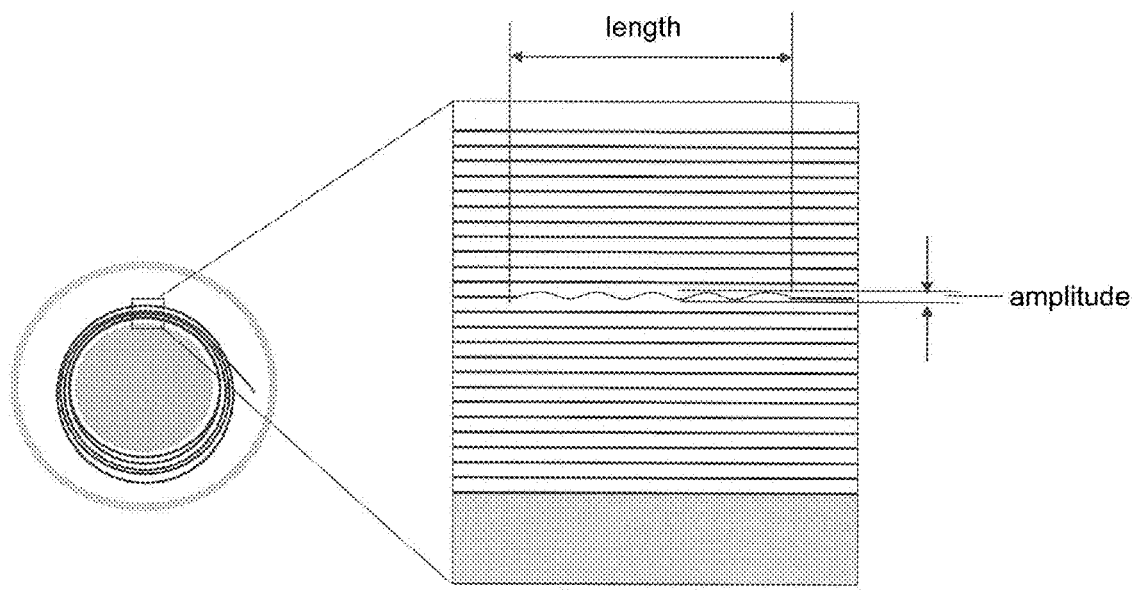
FIG. 10 shows a schematic view illustrating ruffling of a carbonaceous film according to the present invention.

As shown in FIG. 10, ruffling was evaluated as: "slightly present" when ruffling having a length of 30 mm or less and an amplitude of 2 mm or less was found at 1 or more and 5 or less sites; "a few present" when ruffling having a length of 30 mm or more and 60 mm or less was found at 1 or more and 5 or less sites; "present" when ruffling having a length of 61 mm or more was found at 5 or more and 10 or less sites; "significantly ruffling" when ruffling having an amplitude of 6 mm or more and a length of 61 mm or more was found at 5 or more and 10 or less sites; "present" when ruffling having a length of 61 mm or more was found at 10 or more and 19 or less sites; "overall ruffling" when ruffling having a length of 61 mm or more was found at 20 or more sites; "absent" when no ruffling was found; and "bent and fracture" when film has bent and breakage of 50 mm or more generated to extend 2 or more layers of the film.

(Breakage)

Breakage of the carbonaceous film was evaluated in an area of 250 mm×10 m as: "present" when breakage was found at 11 or more sites; "a few present" when breakage was found at 6 or more and 10 or less sites; "slightly present" when breakage was found at 5 or less sites; and "absent" when no breakage was found.

(Wrinkle Following Pressing of Graphitized Film)

Wrinkles were evaluated after pressing a graphitized film of a square of 200 mm×200 mm as: "a few present" when wrinkles were found at two or less sites; "present" when wrinkles were found at 3 or more sites; and "absent" when no wrinkle was generated.

(Production of Vessel "a")

With reference to FIG. 1, vessel "a" was composed of: outer casing 20 having a shape obtained by cutting out to remove a circular cylindrical shape having a diameter of 120 mm and a height of 300 mm from a rectangular solid (columnar body) having a length of 150 mm, a width of 150 mm and a height of 300 mm; and core 10 having a shape in which disc 15 having a diameter of 120 mm and a thickness of 10 mm was connected at both ends of a circular cylinder having a diameter of 100 mm and a height of 280 mm. In addition, the disc 15 having a diameter of 120 mm and a thickness of 10 mm is provided with several holes having a diameter of 10 mm for ventilation. The outer casing 20 and the core 10 were produced from isotropic graphite in their entirety.

(Production of Vessel b)

With reference to FIG. 1, vessel b was composed of: outer casing 20 having a shape obtained by cutting out to remove a circular cylindrical shape having a diameter of 120 mm and a height of 300 mm from a rectangular solid (columnar body) having a length of 150 mm, a width of 150 mm and a height of 300 mm; and core 10 having a shape in which disc 15 having a diameter of 120 mm and a thickness of 10 mm was connected at both ends of a circular cylinder having a diameter of 60 mm and a height of 280 mm. In addition, the disc 15 having a diameter of 120 mm and a thickness of 10 mm is provided with several holes having a diameter of 10 mm for ventilation. The outer casing 20 and the core 10 were produced from isotropic graphite in their entirety.

(Production of Vessel c)

With reference to FIG. 1, vessel c was composed of: outer casing 20 having a shape obtained by cutting out to remove a circular cylindrical shape having a diameter of 125 mm and a height of 300 mm from a rectangular solid (columnar body) having a length of 150 mm, a width of 150 mm and a height of 300 mm; and core 10 having a shape in which disc 15 having a diameter of 125 mm and a thickness of 10 mm was connected at both ends of a circular cylinder having a diameter of 100 mm and a height of 280 mm. In addition, the disc 15 having a diameter of 125 mm and a thickness of 10 mm is provided with several holes having a diameter of, 10 mm for ventilation. The outer casing 20 and the core 10 were produced from isotropic graphite in their entirety.

(Production of Vessel d)

With reference to FIG. 1, vessel d was composed of: outer casing 20 having a shape obtained by cutting out to remove a circular cylindrical shape having a diameter of 140 mm and a height of 300 mm from a rectangular solid (columnar body) having a length of 170 mm, a width of 170 mm and a height of 300 mm; and core 10 having a shape in which disc 15 having a diameter of 140 mm and a thickness of 10 mm was connected at both ends of a circular cylinder having a diameter of 100 mm and a height of 280 mm. In addition, the disc 15 having a diameter of 140 mm and a thickness of 10 mm is provided with several holes having a diameter of 10 mm for ventilation. The outer casing 20 and the core 10 were produced from isotropic graphite in their entirety.

Example A1

Figure 8:
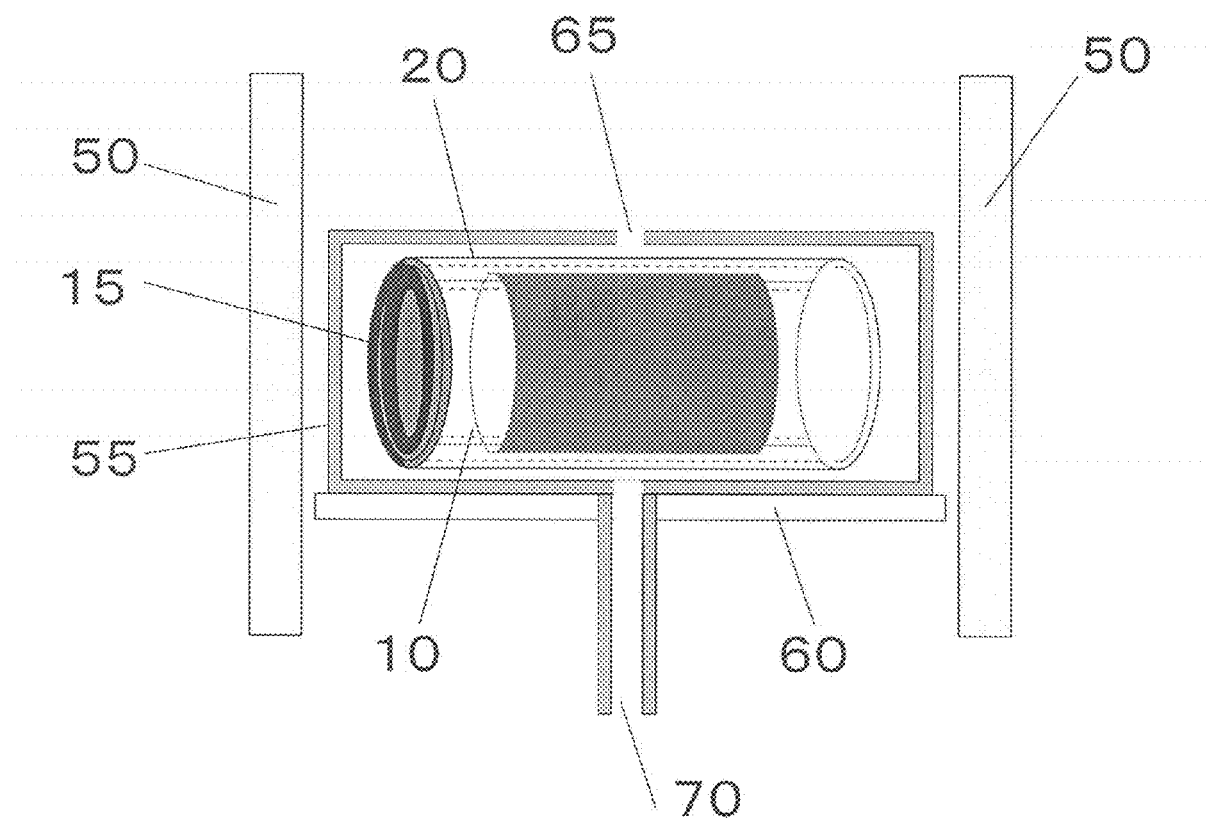
FIG. 8 shows a schematic view illustrating a method for producing a carbonaceous film in Example A1 of the present invention.

As a polymer film, a polyimide film (trade name: Apical 50AH film; thickness: 50 μm) manufactured by Kaneka Corporation, having a width of 250 mm was provided. With reference to FIG. 2, this polymer film was wrapped around a central region of the core 10 of the vessel "a" to give 50 layers, and the core 10 wrapped by the film was placed into the outer casing 20, which was further placed into inner case 55 covered with disc 15 as a lid. Thus provided vessel "a" was transversely situated in an electric furnace as shown in FIG. 8, and the temperature was elevated up to 1,000° C. at a rate of 2° C./min by electrification and heating with heater 50 provided on the external side of the vessel to execute a carbonization treatment. In the carbonization treatment atmosphere, nitrogen was not allowed to flow, and the temperature elevation was continued while keeping the internal pressure at −0.01 kPa by reducing the pressure with a vacuum pump from pressure reduction opening 70. After cooling to room temperature, the thickness, the surface condition, and the weight per unit area (g/m2) of the obtained carbonaceous film were determined. In addition, stain in the furnace before and after treating the film was also evaluated. Subsequently, the carbonaceous film was placed again into the vessel "a", and the temperature was elevated up to 2,900° C. at a rate of 2° C./min to execute a graphitization treatment using a furnace for graphitization. After cooling to room temperature, a part of the graphite film subjected to the heat treatment was cut to give a square of x 200 mm, and sandwiched with polymer films having a length of 250 mm, a width of 250 mm and a thickness of 125

μm from above and below. Then, a subsequent flatwise compressing step was carried out using a compression molding machine. The pressure applied was 10 MPa. The thermal diffusivity of the finally obtained graphite film was determined using a thermal diffusivity measuring instrument ((trade name) "LaserPit" available from ULVAC-RIKO, Inc.) according to an AC calorimetric method at 10 Hz in an atmosphere of 20° C. The results are summarized in Table 1. The phrase "internal pressure being −0.01 kPa with vacuum pump" herein referred to means that the internal pressure of the electric furnace is lower than the outside pressure of the electric furnace by 0.01 kPa.

It is to be noted that when the vessel b was used, similar results to those when the vessel "a" was used were obtained; however, the film after subjecting to the graphitization treatment was accompanied by peculiar winding, and wrinkles were generated in the subsequent flatwise compressing step.

Example A2

A carbonaceous film was produced by an entirely similar method to Example A1 using the vessel "a" except that the temperature elevation was continued in the carbonization treatment atmosphere without allowing nitrogen to flow while keeping the internal pressure at −0.1 kPa. The thickness, the surface condition, and the weight per unit area (g/m2), and the thermal diffusivity after the graphitization treatment of the carbonaceous film are summarized in Table 1. The phrase "internal pressure being −0.1 kPa with vacuum pump" herein referred to means that the internal pressure of the electric furnace is lower than the outside pressure of the electric furnace by 0.1 kPa.

Example A3

A carbonaceous film was produced by an entirely similar method to Example A1 using the vessel "a" except that the temperature elevation was continued in the carbonization treatment atmosphere without allowing nitrogen to flow while keeping the internal pressure at −0.5 kPa. The thickness, the surface condition, and the weight per unit area (g/m2), and the thermal diffusivity after the graphitization treatment of the carbonaceous film are summarized in Table 1. The phrase "internal pressure being −0.5 kPa with vacuum pump" herein referred to means that the internal pressure of the electric furnace is lower than the outside pressure of the electric furnace by 0.5 kPa.

Example A4

A carbonaceous film was produced by an entirely similar method to Example A1 using the vessel "a" except that the temperature elevation was continued in the carbonization treatment atmosphere without allowing nitrogen to flow while keeping the internal pressure at −1 kPa. The thickness, the surface condition, and the weight per unit area (g/m2), and the thermal diffusivity after the graphitization treatment of the carbonaceous film are summarized in Table 1. The phrase "internal pressure being −1 kPa with vacuum pump" herein referred to means that the internal pressure of the electric furnace is lower than the outside pressure of the electric furnace by 1 kPa.

Example A5

A carbonaceous film was produced by an entirely similar method to Example A1 using the vessel "a" except that the temperature elevation was continued in the carbonization treatment atmosphere without allowing nitrogen to flow while keeping the internal pressure at −10 kPa. The thickness, the surface condition, and the weight per unit area (g/m2), and the thermal diffusivity after the graphitization treatment of the carbonaceous film are summarized in Table 1. The phrase "internal pressure being −10 kPa with vacuum pump" herein referred to means that the internal pressure of the electric furnace is lower than the outside pressure of the electric furnace by 10 kPa.

When the polyimide film was subjected to a carbonization treatment under a reduced pressure, a long carbonaceous film was obtained without causing fusion.

Example A6

A carbonaceous film was produced by an entirely similar method to Example A1 using the vessel "a" except that the temperature elevation was continued in the carbonization treatment atmosphere in a nitrogen stream (1.0 L/min) while keeping the internal pressure at −10 kPa. The thickness, the surface condition, and the weight per unit area (g/m2), and the thermal diffusivity after the graphitization treatment of the carbonaceous film are summarized in Table 1. The phrase "internal pressure being −10 kPa with vacuum pump" herein referred to means that the internal pressure of the electric furnace is lower than the outside pressure of the electric furnace by 10 kPa.

When the polyimide film was subjected to a carbonization treatment in a nitrogen stream under a reduced pressure, a long carbonaceous film was successfully obtained without causing fusion. In addition, stain in the furnace decreased as compared with the case in which nitrogen flow was absent.

Example A7

A carbonaceous film was produced by an entirely similar method to Example A1 using the vessel "a" except that the temperature elevation was continued in the carbonization treatment atmosphere without allowing nitrogen to flow while keeping the internal pressure at −80 kPa. The thickness, the surface condition, and the weight per unit area (g/m2), and the thermal diffusivity after the graphitization treatment of the carbonaceous film are summarized in Table 1. The phrase "internal pressure being −80 kPa with vacuum pump" herein referred to means that the internal pressure of the electric furnace is lower than the outside pressure of the electric furnace by 80 kPa.

Even with a comparatively high degree of pressure reduction, a long carbonaceous film was obtained without causing fusion. However, stain in the furnace increased as compared with the case in which nitrogen flow was present.

Example A8

A carbonaceous film was produced by an entirely similar method to Example A1 using the vessel "a" except that the temperature elevation was continued in the carbonization treatment atmosphere without allowing nitrogen to flow while keeping the internal pressure at −90 kPa. The thickness, the surface condition, and the weight per unit area (g/m2), and the thermal diffusivity after the graphitization treatment of the carbonaceous film are summarized in Table 7. The phrase "internal pressure being −90 kPa with vacuum pump" herein referred to means that the internal pressure of the electric furnace is lower than the outside pressure of the electric furnace by −90 kPa.

A favorable carbonization film was successfully obtained without causing fusion, although the thermal diffusivity of the resulting graphite film decreased to some extent under the condition with a comparatively high degree of pressure reduction.

Comparative Example A1

A carbonaceous film was produced by an entirely similar method to Example A1 using the vessel "a" except that the temperature elevation was continued in the carbonization treatment atmosphere without allowing nitrogen to flow while keeping the internal pressure at ±0 kPa. The thickness, the surface condition, and the weight per unit area (g/m2), and the thermal diffusivity after the graphitization treatment of the carbonaceous film are summarized in Table 1.

When the polyimide film was subjected to a carbonization treatment under an ordinary pressure, occurrence of fusion was observed.

Comparative Example A2

A carbonaceous film was produced by an entirely similar method to Example A1 using the vessel "a" except that the temperature elevation was continued in the carbonization treatment atmosphere in a nitrogen stream (1.0 L/min) while keeping the internal pressure at +2 kPa. The thickness, the surface condition, and the weight per unit area (g/m2), and the thermal diffusivity after the graphitization treatment of the carbonaceous film are summarized in Table 1. The phrase "internal pressure being +2 kPa with vacuum pump" herein referred to means that the internal pressure of the electric furnace is higher than the outside pressure of the electric furnace by 2 kPa.

Under the pressurized condition, the fusion further proceeded as compared with the case under the ordinary pressure.

Example A9

As a polymer film, a polyimide film (trade name: Apical 75AH film; thickness: 75 μm) manufactured by Kaneka Corporation, having a width of 250 mm was provided. With reference to FIG. 2, this polymer film was wrapped around a central region of the core of the vessel "a" to give 50 layers, and the core wrapped by the film was placed into an outer casing. The vessel "a" including thus set film was transversely situated in an electric furnace, and the temperature was elevated up to 1,000° C. at a rate of 2° C./min to execute a carbonization treatment. In the carbonization treatment atmosphere, nitrogen was not allowed to flow, and the temperature elevation was continued while keeping the internal pressure at −0.01 kPa with a vacuum pump. After cooling to room temperature, the thickness, the surface condition, and the weight per unit area (g/m2) of the obtained carbonaceous film were determined. In addition, stain in the furnace before and after treating the film was also evaluated. Subsequently, the carbonaceous film was placed again into the vessel "a", and the temperature was elevated up to 2,900° C. at a rate of 2° C./min to execute a graphitization treatment using a furnace for graphitization. After cooling to room temperature, a part of the graphite film subjected to the heat treatment was cut to give a square of x 200 mm, and sandwiched with polymer films having a length of 250 mm, a width of 250 mm and a thickness of 125 μm from above and below. Then, a subsequent flatwise compressing step was carried out using a compression molding machine. The pressure applied was 10 MPa. The thermal diffusivity of the finally obtained graphite film was determined using a thermal diffusivity measuring instrument ((trade name) "LaserPit" available from ULVAC-RIKO, Inc.) according to an AC calorimetric method at 10 Hz in an atmosphere of 20° C. The results are summarized in Table 2. The phrase "internal pressure being −0.01 kPa with vacuum

TABLE 1

| | Carbonization atmosphere (~1,000° C.) | | | Carbonaceous film | | | Graphitized film | |
|---|---|---|---|---|---|---|---|---|
| | Internal pressure of furnace | Flow rate of nitrogen | V/V1 | Thickness [μm] | Weight per unit area [g/m2] | Fusion | Thermal diffusivity [cm2/s] | Stain in furnace |
| Example A1 | −0.01 kPa | — | — | 41 | 70 | a few present | 8.2 | a few present |
| Example A2 | −0.1 kPa | — | — | 41 | 70 | absent | 8.2 | a few present |
| Example A3 | −0.5 kPa | — | — | 41 | 70 | absent | 8.2 | a few present |
| Example A4 | −1 kPa | — | — | 41 | 70 | absent | 8.2 | a few present |
| Example A5 | −10 kPa | — | — | 41 | 70 | absent | 8.2 | a few present |
| Example A6 | −10 kPa | 1.0 L/min | 6.8 | 41 | 70 | absent | 8.2 | absent |
| Example A7 | −80 kPa | — | — | 41 | 69 | absent | 8.1 | a few present |
| Example A8 | −90 kPa | — | — | 41 | 64 | absent | 7.8 | a few present |
| Comparative Example A1 | ±0 kPa | — | — | 41 | 70 | present | 8.2 | a few present |
| Comparative Example A2 | ±2 kPa | 1.0 L/min | 6.8 | 42 | 71 | a lot present | 8.1 | a lot present | pump" herein referred to means that the internal pressure of the electric furnace is lower than the outside pressure of the electric furnace by 0.01 kPa.

Example A10

A carbonaceous film was produced by an entirely similar method to Example A9 except that the temperature elevation was continued in the carbonization treatment atmosphere without allowing nitrogen to flow while keeping the internal pressure at −0.1 kPa. The thickness, the surface condition, and the weight per unit area (g/m2), and the thermal diffusivity after the graphitization treatment of the carbonaceous film are summarized in Table 2. The phrase "internal pressure being −0.1 kPa with vacuum pump" herein referred to means that the internal pressure of the electric furnace is lower than the outside pressure of the electric furnace by 0.1 kPa.

Example A11

A carbonaceous film was produced by an entirely similar method to Example A9 except that the temperature elevation was continued in the carbonization treatment atmosphere without allowing nitrogen to flow while keeping the internal pressure at −0.5 kPa. The thickness, the surface condition, and the weight per unit area (g/m2), and the thermal diffusivity after the graphitization treatment of the carbonaceous film are summarized in Table 2. The phrase "internal pressure being −0.5 kPa with vacuum pump" herein referred to means that the internal pressure of the electric furnace is lower than the outside pressure of the electric furnace by 0.5 kPa.

Example A12

A carbonaceous film was produced by an entirely similar method to Example A9 except that the temperature elevation was continued in the carbonization treatment atmosphere without allowing nitrogen to flow while keeping the internal pressure at −1 kPa. The thickness, the surface condition, and the weight per unit area (g/m2), and the thermal diffusivity after the graphitization treatment of the carbonaceous film are summarized in Table 2. The phrase "internal pressure being −1 kPa with vacuum pump" herein referred to means that the internal pressure of the electric furnace is lower than the outside pressure of the electric furnace by 1 kPa.

Example A13

A carbonaceous film was produced by an entirely similar method to Example A9 except that the temperature elevation was continued in the carbonization treatment atmosphere without allowing nitrogen to flow while keeping the internal pressure at −10 kPa. The thickness, the surface condition, and the weight per unit area (g/m2), and the thermal diffusivity after the graphitization treatment of the carbonaceous film are summarized in Table 2. The phrase "internal pressure being −10 kPa with vacuum pump" herein referred to means that the internal pressure of the electric furnace is lower than the outside pressure of the electric furnace by 10 kPa.

The polyimide film having a thickness of 75 μm was more likely to cause fusion as compared with the polyimide film having a thickness of 50 μm, and complete suppression of the fusion failed under a reduced pressure of about −10 kPa.

Example A14

A carbonaceous film was produced by an entirely similar method to Example A9 except that the temperature elevation was continued in the carbonization treatment atmosphere in a nitrogen stream (1.0 L/min) while keeping the internal pressure at −10 kPa. The thickness, the surface condition, and the weight per unit area (g/m2), and the thermal diffusivity after the graphitization treatment of the carbonaceous film are summarized in Table 2. The phrase "internal pressure being −10 kPa with vacuum pump" herein referred to means that the internal pressure of the electric furnace is lower than the outside pressure of the electric furnace by 10 kPa.

When the carbonization was carried out while allowing nitrogen to flow at −10 kPa, complete suppression of the fusion succeeded.

Example A15

A carbonaceous film was produced by an entirely similar method to Example A9 except that the temperature elevation was continued in the carbonization treatment atmosphere without allowing nitrogen to flow while keeping the internal pressure at −80 kPa. The thickness, the surface condition, and the weight per unit area (g/m2), and the thermal diffusivity after the graphitization treatment of the carbonaceous film are summarized in Table 2. The phrase "internal pressure being −80 kPa with vacuum pump" herein referred to means that the internal pressure of the electric furnace is lower than the outside pressure of the electric furnace by 80 kPa.

Also when the carbonization treatment with a still higher degree of pressure reduction, suppression of fusion succeeded.

Example A16

A carbonaceous film was produced by an entirely similar method to Example A9 except that the temperature elevation was continued in the carbonization treatment atmosphere without allowing nitrogen to flow while keeping the internal pressure at −90 kPa. The thickness, the surface condition, and the weight per unit area (g/m2), and the thermal diffusivity after the graphitization treatment of the carbonaceous film are summarized in Table 7. The phrase "internal pressure being −90 kPa with vacuum pump" herein referred to means that the internal pressure of the electric furnace is higher than the outside pressure of the electric furnace by −90 kPa.

A favorable carbonization film was successfully obtained without causing fusion, although the thermal diffusivity of the resulting graphite film decreased to some extent under the condition with a comparatively high degree of pressure reduction.

Comparative Example A3

A carbonaceous film was produced by an entirely similar method to Example A9 except that the temperature elevation was continued in the carbonization treatment atmosphere without allowing nitrogen to flow while keeping the internal pressure at ±0 kPa. The thickness, the surface condition, and the weight per unit area (g/m2), and the thermal diffusivity after the graphitization treatment of the carbonaceous film are summarized in Table 2.

Comparative Example A4

A carbonaceous film was produced by an entirely similar method to Example A9 except that the temperature elevation was continued in the carbonization treatment atmosphere in a nitrogen stream (1.0 L/min) while keeping the internal pressure at +2 kPa. The thickness, the surface condition, and the weight per unit area (g/m2), and the thermal diffusivity after the graphitization treatment of the carbonaceous film are summarized in Table 2. The phrase "internal pressure being +2 kPa with vacuum pump" herein referred to means that the internal pressure of the electric furnace is higher than the outside pressure of the electric furnace by 2 kPa.

Under the pressurized condition, the fusion further proceeded.

TABLE 2

| | Carbonization Atmosphere (~1,000° C.) | | | Carbonaceous Film | | | Graphitized | |
|---|---|---|---|---|---|---|---|---|
| | Internal Pressure Of Furnace | Flow Rate Of Nitrogen | V/V1 | Thickness [μm] | Weight Per Unit Area [g/m2] | Fusion | Film Thermal Diffusivity [cm2/s] | Stain in furnace |
| Example A9 | −0.01 kPa | — | — | 63 | 91 | somewhat a lot present | 8.2 | a few present |
| Example A10 | −0.1 kPa | — | — | 63 | 91 | a few present | 8.2 | a few present |
| Example A11 | −0.5 kPa | — | — | 63 | 91 | a few present | 8.3 | a few present |
| Example A12 | −1 kPa | — | — | 63 | 91 | a few present | 8.3 | a few present |
| Example A13 | −10 kPa | — | — | 63 | 91 | a few present | 8.2 | a few present |
| Example A14 | −10 kPa | 1.0 L/min | 6.8 | 63 | 91 | absent | 8.2 | absent |
| Example A15 | −80 kPa | — | — | 63 | 88 | absent | 8.1 | a few present |
| Example A16 | −90 kPa | — | — | 63 | 82 | absent | 7.8 | a few present |
| Comparative Example A3 | ±0 kPa | — | — | 63 | 91 | a lot present | 8.1 | a few present |
| Comparative Example A4 | ±2 kPa | 1.0 L/min | 6.8 | 64 | 92 | a lot present | 8.1 | a few present |

From the results shown in Table 1 and Table 2, it was proven that the extent of fusion was more significant in the polyimide film having a thickness of 75 μm as compared with that of 50 μm.

Example A17

As a polymer film, a polyimide film (trade name: Apical 50AH film; thickness: 50 μm) manufactured by Kaneka Corporation, having a width of 250 mm was provided. With reference to FIG. 2, this polymer film was wrapped around a central region of the core of the vessel c to give 75 layers, and the core wrapped by the film was placed into an outer casing. The vessel c including thus set film was transversely situated in an electric furnace, and the temperature was elevated up to 1,000° C. at a rate of 2° C./min to execute a carbonization treatment. The carbonization treatment was carried out in a nitrogen stream (flow rate: 1 L/min) in which the temperature elevation was continued while keeping the internal pressure at −0.01 kPa with a vacuum pump. After cooling to room temperature, thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 3. The phrase "internal pressure being −0.01 kPa with vacuum pump" herein referred to means that the internal pressure of the electric furnace is lower than the outside pressure of the electric furnace by 0.01 kPa.

Example A18

A carbonaceous film was produced by an entirely similar method to Example A17 except that the temperature elevation was continued in the carbonization treatment atmosphere in a nitrogen stream (1.0 L/min) while keeping the internal pressure at −0.1 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 3. The phrase "internal pressure being −0.1 kPa with vacuum pump" herein referred to means that the internal pressure of the electric furnace is lower than the outside pressure of the electric furnace by 0.1 kPa.

Example A19

A carbonaceous film was produced by an entirely similar method to Example A17 except that the temperature elevation was continued in the carbonization treatment atmosphere in a nitrogen stream (1.0 L/min) while keeping the internal pressure at −0.5 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 3. The phrase "internal pressure being −0.5 kPa with vacuum pump" herein referred to means that the internal pressure of the electric furnace is lower than the outside pressure of the electric furnace by 0.5 kPa.

Example A20

A carbonaceous film was produced by an entirely similar method to Example A17 except that the temperature elevation was continued in the carbonization treatment atmosphere in a nitrogen stream (1.0 L/min) while keeping the internal pressure at −1 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 3. The phrase "internal pressure being −1 kPa with vacuum pump" herein referred to means that the internal pressure of the electric furnace is lower than the outside pressure of the electric furnace by 1 kPa.

Example A21

A carbonaceous film was produced by an entirely similar method to Example A17 except that the temperature elevation was continued in the carbonization treatment atmosphere in a nitrogen stream (1.0 L/min) while keeping the internal pressure at −10 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 3. The phrase "internal pressure being −10 kPa with vacuum pump" herein referred to means that the internal pressure of the electric furnace is lower than the outside pressure of the electric furnace by 10 kPa.

By carrying out the carbonization treatment under a reduced pressure while allowing nitrogen to flow, suppression of fusion succeeded. It was also proven that when the flow rate of nitrogen is the same, a higher degree of pressure reduction results in a greater ability of suppressing fusion.

Example A22

A carbonaceous film was produced by an entirely similar method to Example A17 except that the temperature elevation was continued in the carbonization treatment atmosphere without allowing nitrogen to flow while keeping the internal pressure at −10 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 3. The phrase "internal pressure being −10 kPa with vacuum pump" herein referred to means that the internal pressure of the electric furnace is lower than the outside pressure of the electric furnace by 10 kPa.

Example A23

A carbonaceous film was produced by an entirely similar method to Example A17 except that the temperature elevation was continued in the carbonization treatment atmosphere without allowing nitrogen to flow while keeping the internal pressure at −80 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 3. The phrase "internal pressure being −80 kPa with vacuum pump" herein referred to means that the internal pressure of the electric furnace is lower than the outside pressure of the electric furnace by 80 kPa.

Even though the carbonization treatment was carried out without allowing nitrogen to flow but only with pressure reduction, the fusion was suppressed to some extent; however, the suppressive effect was inferior as compared with the case in which the treatment was carried out while allowing nitrogen to flow.

Example A24

A carbonaceous film was produced by an entirely similar method to Example A17 except that the temperature elevation was continued in the carbonization treatment atmosphere in a nitrogen stream (5.0 L/min) while keeping the internal pressure at −10 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 3. The phrase "internal pressure being −10 kPa with vacuum pump" herein referred to means that the internal pressure of the electric furnace is lower than the outside pressure of the electric furnace by 10 kPa.

When the flow rate of nitrogen was elevated, the effect of improving problems of fusion was further observed.

Comparative Example A5

A carbonaceous film was produced by an entirely similar method to Example A17 except that the temperature elevation was continued in the carbonization treatment atmosphere in a nitrogen stream (1.0 L/min) while keeping the internal pressure at ±0 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 3.

Comparative Example A6

A carbonaceous film was produced by an entirely similar method to Example A17 except that the temperature elevation was continued in the carbonization treatment atmosphere in a nitrogen stream (1.0 L/min) while keeping the internal pressure at +2 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 3. The phrase "internal pressure being +2 kPa with vacuum pump" herein referred to means that the internal pressure of the electric furnace is higher than the outside pressure of the electric furnace by 2 kPa.

According to the carbonization treatment carried out under ordinary pressure, or under pressurized condition, fusion of the film occurred.

TABLE 3

| | Carbonization atmosphere (~1,000° C.) | | | | | | | | |
|---|---|---|---|---|---|---|---|---|---|
| | Internal pressure of furnace | Flow rate of nitrogen | V/V1 | 75 layers | 100 layers | 125 layers | 150 layers | 175 layers | 200 layers |
| Example A17 | −0.01 kPa | 1.0 L/min | 6.8 | A | A | A | B | C | C |
| Example A18 | −0.1 kPa | 1.0 L/min | 6.8 | A | A | A | A | B | C |
| Example A19 | −0.5 kPa | 1.0 L/min | 6.8 | A | A | A | A | A | B |
| Example A20 | −1 kPa | 1.0 L/min | 6.8 | A | A | A | A | A | B |
| Example A21 | −10 kPa | 1.0 L/min | 6.8 | A | A | A | A | A | B |
| Example A22 | −10 kPa | — | — | A | A | A | B | C | C |
| Example A23 | −80 kPa | — | — | A | A | A | B | B | C |
| Example A24 | −10 kPa | 5.0 L/min | 1.4 | A | A | A | A | A | A |
| Comparative Example A5 | ±0 kPa | 1.0 L/min | 6.8 | B | B | C | C | C | C |
| Comparative Example A6 | ±2 kPa | 1.0 L/min | 6.8 | B | C | C | C | C | C |

Example A25

As a polymer film, a polyimide film (trade name: Apical 75AH film; thickness: 75 μm) manufactured by Kaneka Corporation, having a width of 250 mm was provided. With reference to FIG. 2, this polymer film was wrapped around a central region of the core of the vessel d to give 75 layers, and the core wrapped by the film was placed into an outer casing. The vessel d including thus set film was transversely situated in an electric furnace, and the temperature was elevated up to 1,000° C. at a rate of 2° C./min to execute a carbonization treatment. The carbonization treatment was carried out in a nitrogen stream (flow rate: 1 L/min) in which the temperature elevation was continued while keeping the internal pressure at −0.01 kPa with a vacuum pump. After cooling to room temperature, thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 4. The phrase "internal pressure being −0.01 kPa with vacuum pump" herein referred to means that the internal pressure of the electric furnace is lower than the outside pressure of the electric furnace by 0.01 kPa.

Example A26

A carbonaceous film was produced by an entirely similar method to Example A25 except that the temperature elevation was continued in the carbonization treatment atmosphere in a nitrogen stream (1.0 L/min) while keeping the internal pressure at −0.1 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 4. The phrase "internal pressure being −0.1 kPa with vacuum pump" herein referred to means that the internal pressure of the electric furnace is lower than the outside pressure of the electric furnace by 0.1 kPa.

Example A27

A carbonaceous film was produced by an entirely similar method to Example A25 except that the temperature elevation was continued in the carbonization treatment atmosphere in a nitrogen stream (1.0 L/min) while keeping the internal pressure at −0.5 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 4. The phrase "internal pressure being −0.5 kPa with vacuum pump" herein referred to means that the internal pressure of the electric furnace is lower than the outside pressure of the electric furnace by 0.5 kPa.

Example A28

A carbonaceous film was produced by an entirely similar method to Example A25 except that the temperature elevation was continued in the carbonization treatment atmosphere in a nitrogen stream (1.0 L/min) while keeping the internal pressure at −1 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 4. The phrase "internal pressure being −1 kPa with vacuum pump" herein referred to means that the internal pressure of the electric furnace is lower than the outside pressure of the electric furnace by 1 kPa.

Example A29

A carbonaceous film was produced by an entirely similar method to Example A25 except that the temperature elevation was continued in the carbonization treatment atmosphere in a nitrogen stream (1.0 L/min) while keeping the internal pressure at −10 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 4. The phrase "internal pressure being −10 kPa with vacuum pump" herein referred to means that the internal pressure of the electric furnace is lower than the outside pressure of the electric furnace by 10 kPa.

It was proven that the polyimide film having a thickness of 75 μm is more likely to cause fusion as compared with the polyimide film having a thickness of 50 μm. Also in the case of 75 μm, suppression of fusion succeeded by carrying out the carbonization treatment under a reduced pressure while allowing nitrogen to flow. It was also proven that when the flow rate of nitrogen is the same, a higher degree of pressure reduction results in a greater ability of suppressing fusion.

Example A30

A carbonaceous film was produced by an entirely similar method to Example A25 except that the temperature elevation was continued in the carbonization treatment atmosphere without allowing nitrogen to flow while keeping the internal pressure at −10 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 4. The phrase "internal pressure being −10 kPa with vacuum pump" herein referred to means that the internal pressure of the electric furnace is lower than the outside pressure of the electric furnace by 10 kPa.

Example A31

A carbonaceous film was produced by an entirely similar method to Example A25 except that the temperature elevation was continued in the carbonization treatment atmosphere without allowing nitrogen to flow while keeping the internal pressure at −80 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 4. The phrase "internal pressure being −80 kPa with vacuum pump" herein referred to means that the internal pressure of the electric furnace is lower than the outside pressure of the electric furnace by 80 kPa.

Even though the carbonization treatment was carried out without allowing nitrogen to flow but only with pressure reduction, the fusion was suppressed; however, the suppressive effect was inferior as compared with the case in which the treatment was carried out while allowing nitrogen to flow.

Example A32

A carbonaceous film was produced by an entirely similar method to Example A25 except that the temperature elevation was continued in the carbonization treatment atmosphere in a nitrogen stream (5.0 L/min) while keeping the internal pressure at −10 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 4. The phrase "internal pressure being −10 kPa with vacuum pump" herein referred to means that the internal pressure of the electric furnace is lower than the outside pressure of the electric furnace by 10 kPa.

When the flow rate of nitrogen was elevated, the effect of improving problems of fusion was further observed.

Example A33

As a polymer film, a polyimide film (trade name: Apical 75AH film; thickness: 75 μm) manufactured by Kaneka Corporation, having a width of 250 mm was provided. With reference to FIG. 3, this polymer film was wrapped around a bottom region of the core of the vessel "a" to give 75 layers, and the core wrapped by the film was placed into an outer casing. The vessel "a" including thus set film was vertically situated in an electric furnace, and the temperature was elevated up to 1,000° C. at a rate of 2° C./min to execute a carbonization treatment. The carbonization treatment was carried out in a nitrogen stream (flow rate: 5 L/min) in which the temperature elevation was continued while keeping the internal pressure at −10 kPa with a vacuum pump. After cooling to room temperature, Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 4. The phrase "internal pressure being −10 kPa with vacuum pump" herein referred to means that the internal pressure of the electric furnace is lower than the outside pressure of the electric furnace by 10 kPa.

It was proven that when the carbonization treatment was carried out with the vessel situated vertically, fusion is more likely to occur as compared with the case in which the vessel was transversely situated.

Comparative Example A7

A carbonaceous film was produced by an entirely similar method to Example A25 except that the temperature elevation was continued in the carbonization treatment atmosphere in a nitrogen stream (1.0 L/min) while keeping the internal pressure at ±0 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 4.

Comparative Example A8

A carbonaceous film was produced by an entirely similar method to Example A25 except that the temperature elevation was continued in the carbonization treatment atmosphere in a nitrogen stream (1.0 L/min) while keeping the internal pressure at +2 kPa. Thus obtained carbonaceous film was evaluated as to whether or not fused on the following three criteria, A: fusion absent; B: some fusion present; and C: fusion entirely present. In a similar manner, samples wrapped with the film to give 100 layers, 125 layers, 150 layers, 175 layers, and 200 layers were also evaluated whether or not the fusion occurred after the carbonization treatment. The results are summarized in Table 4. The phrase "internal pressure being +2 kPa with vacuum pump" herein referred to means that the internal pressure of the electric furnace is higher than the outside pressure of the electric furnace by 2 kPa.

According to the carbonization treatment carried out under ordinary pressure, or under pressurized condition, fusion of the film occurred.

TABLE 4

|  | Carbonization atmosphere (~1,000° C.) | | | | | | | |
| --- | --- | --- | --- | --- | --- | --- | --- | --- |
|  | Internal pressure of furnace | Flow rate of nitrogen | V/V1 | 75 layers | 100 layers | 125 layers | 150 layers | 175 layers | 200 layers |
| Example A25 | −0.01 kPa | 1.0 L/min | 6.8 | A | A | B | B | C | C |
| Example A26 | −0.1 kPa | 1.0 L/min | 6.8 | A | A | A | B | C | C |
| Example A27 | −0.5 kPa | 1.0 L/min | 6.8 | A | A | A | A | B | C |
| Example A28 | −1 kPa | 1.0 L/min | 6.8 | A | A | A | A | B | C |
| Example A29 | −10 kPa | 1.0 L/min | 6.8 | A | A | A | A | B | C |
| Example A30 | −10 kPa | — | — | A | A | B | B | C | C |
| Example A31 | −80 kPa | — | — | A | A | B | C | C |
| Example A32 | −10 kPa | 5.0 L/min | 1.4 | A | A | A | A | A | B |
| Example A33 | −10 kPa | 5.0 L/min | 1.4 | A | B | B | C | C |
| Comparative Example A7 | ±0 kPa | 1.0 L/min | 6.8 | B | C | C | C | C | C |
| Comparative Example A8 | ±2 kPa | 1.0 L/min | 6.8 | C | C | C | C | C | C |

In all these Examples and Comparative Examples (Examples A1 to A33, and Comparative Examples A1 to A8), even when polyimide films (trade name: Kapton®H film; thickness: 75 μm and 50 μm) manufactured by Du Pont-Toray Co., Ltd., having a width of 250 mm were used, similar effects were achieved.

Next, a vessel having an outer casing as a constraining means will be explained by way of various Examples and Comparative Examples.

(Production of Vessel A)

With reference to FIG. 5, vessel A was composed of: outer casing 20 having a shape indicated by an internal diameter of 155 mm, an external diameter of 165 mm, a thickness of 5 mm, and a height of 300 mm; and core 10 having a shape in which disc 15 having a diameter of 155 mm and a height of 10 mm was connected at both ends of a circular cylinder having a diameter of 80 mm and a height of 280 mm. In addition, the disc 15 having a diameter of 155 mm and a height of 10 mm is provided with several holes having a diameter of 10 mm for ventilation. The outer casing 20 and the core 10 were produced from isotropic graphite in their entirety.

Example B1

As a polymer film, a polyimide film (trade name: Apical 75AH film; thickness: 75 μm) manufactured by Kaneka Corporation, having a width of 250 mm was provided. With reference to FIG. 2, this polymer film was wrapped around a central region of the core of the vessel A to give 100 layers (thickness of wrapping: 7.5 mm), and the core wrapped by the film was placed into an outer casing. The vessel A including thus set film was transversely situated in an electric furnace, and the temperature was elevated from room temperature up to 1,000° C. at a rate of 1° C./min to execute a carbonization treatment. The carbonization treatment was carried out in a nitrogen stream. After cooling to room temperature, the obtained carbonaceous film was examined as to whether or not ruffling and fusion are present. Subsequently, the carbonaceous film was placed again into the vessel A, and the temperature was elevated up to 2,900° C. at a rate of 2° C./min to execute a graphitization treatment using a furnace for graphitization. After cooling to room temperature, a part of the graphite film subjected to the heat treatment was cut to give a square of x 200 mm, and the surface state thereof was examined. Thereafter, the square piece of the heat-treated graphite film was sandwiched with polymer films having a length of 250 mm, a width of 250 mm and a thickness of 125 μm from above and below. Then, a subsequent flatwise compressing step was carried out using a compression molding machine. The pressure applied was 10 MPa. The finally obtained graphite film was examined as to whether or not wrinkles are present. The results are summarized in Table 5.

Although the obtained carbonaceous film had the surface ruffled in part, compression and flexibilization treatment after the graphitization were successively executed without accompanied by wrinkles. No fusion of the carbonaceous film was observed.

(Production of Vessel B)

With reference to FIG. 5, vessel B was composed of: outer casing 20 having a shape indicated by an internal diameter of 130 mm, an external diameter of 140 mm, a thickness of 5 mm, and a height of 300 mm; and core 10 having a shape in which disc 15 having a diameter of 130 mm and a height of 10 mm was connected at both ends of a circular cylinder having a diameter of 80 mm and a height of 280 mm. In addition, the disc 15 having a diameter of 130 mm and a height of 10 mm is provided with several holes having a diameter of 10 mm for ventilation. The outer casing 20 and the core 10 were produced from isotropic graphite in their entirety.

Example B2

As a polymer film, a polyimide film (trade name: Apical 75AH film; thickness: 75 μm) manufactured by Kaneka Corporation, having a width of 250 mm was provided. A carbonaceous film and a graphite film were produced by an entirely similar method to Example B1 except that the vessel B was used in place of the vessel A. The results of the presence or absence of ruffling and fusion of the obtained carbonaceous film, and the presence or absence of wrinkle of the finally obtained graphite film are summarized in Table 5.

Although the obtained carbonaceous film had the surface ruffled in part, the degree of ruffling was smaller as compared with the case of Example B1, and the compression and flexibilization treatment was successfully executed without accompanied by wrinkles. No fusion of the carbonaceous film was observed.

(Production of Vessel C)

With reference to FIG. 5, vessel C was composed of: outer casing 20 having a shape indicated by an internal diameter of 110 mm, an external diameter of 120 mm, a thickness of 5 mm, and a height of 300 mm; and core 10 having a shape in which disc 15 having a diameter of 110 mm and a height of 10 mm was connected at both ends of a circular cylinder having a diameter of 80 mm and a height of 280 mm. In addition, the disc 15 having a diameter of 110 mm and a height of 10 mm is provided with several holes having a diameter of 10 mm for ventilation. The outer casing 20 and the core 10 were produced from isotropic graphite in their entirety.

Example B3

As a polymer film, a polyimide film (trade name: Apical 75AH film; thickness: 75 μm) manufactured by Kaneka Corporation, having a width of 250 mm was provided. A carbonaceous film and a graphite film were produced by an entirely similar method to Example B1 except that the vessel C was used in place of the vessel A. The results of the presence or absence of ruffling and fusion of the obtained carbonaceous film, and the presence or absence of wrinkle of the finally obtained graphite film are summarized in Table 5.

In Example B3, a favorable carbonaceous film free from surface ruffling was successfully obtained. Also, fusion of the film was not observed.

(Production of Vessel D)

With reference to FIG. 5, vessel D was composed of: outer casing 20 having a shape indicated by an internal diameter of 105 mm, an external diameter of 115 mm, a thickness of 5 mm, and a height of 300 mm; and core 10 having a shape in which disc 15 having a diameter of 100 mm and a height of 10 mm was connected at both ends of a circular cylinder having a diameter of 80 mm and a height of 280 mm. In addition, the disc 15 having a diameter of 100 mm and a height of 10 mm is provided with several holes having a diameter of 10 mm for ventilation. The outer casing 20 and the core 10 were produced from isotropic graphite in their entirety.

Example B4

As a polymer film, a polyimide film (trade name: Apical 75AH film; thickness: 75 μm) manufactured by Kaneka Corporation, having a width of 250 mm was provided. A carbonaceous film and a graphite film were produced by an entirely similar method to Example B1 except that the vessel D was used in place of the vessel A. The results of the presence or absence of ruffling and fusion of the obtained carbonaceous film, and the presence or absence of wrinkle of the finally obtained graphite film are summarized in Table 5.

In Example B4, a favorable carbonaceous film free from surface ruffling was successfully obtained. Also, fusion of the film was not observed.

(Production of Vessel E)

With reference to FIG. 5, vessel E was composed of: outer casing 20 having a shape indicated by an internal diameter of 100 mm, an external diameter of 110 mm, a thickness of 5 mm, and a height of 300 mm; and core 10 having a shape in which disc 15 having a diameter of 100 mm and a height of 10 mm was connected at both ends of a circular cylinder having a diameter of 80 mm and a height of 280 mm. In addition, the disc 15 having a diameter of 100 mm and a height of 10 mm is provided with several holes having a diameter of 10 mm for ventilation. The outer casing 20 and the core 10 were produced from isotropic graphite in their entirety.

Example B5

As a polymer film, a polyimide film (trade name: Apical 75AH film; thickness: 75 μm) manufactured by Kaneka Corporation, having a width of 250 mm was provided. A carbonaceous film and a graphite film were produced by an entirely similar method to Example B1 except that the vessel E was used in place of the vessel A. The results of the presence or absence of ruffling and fusion of the obtained carbonaceous film, and the presence or absence of wrinkle of the finally obtained graphite film are summarized in Table 5.

In Example 35, a favorable carbonaceous film free from surface ruffling was successfully obtained. Although fusion of the film was slightly present, the fused portion was releasable by hand.

(Production of Vessel F)

With reference to FIG. 5, vessel F was composed of: outer casing 20 having a shape indicated by an internal diameter of 98.8 mm, an external diameter of 108.8 mm, a thickness of 5 mm, and a height of 300 mm; and core 10 having a shape in which disc 15 having a diameter of 97.5 mm and a height of 10 mm was connected at both ends of a circular cylinder having a diameter of 80 mm and a height of 280 mm. In addition, the disc 15 having a diameter of 97.5 mm and a height of 10 mm is provided with several holes having a diameter of 10 mm for ventilation. The outer casing 20 and the core 10 were produced from isotropic graphite in their entirety.

Example B6

As a polymer film, a polyimide film (trade name: Apical 75AH film; thickness: 75 μm) manufactured by Kaneka Corporation, having a width of 250 mm was provided. A carbonaceous film and a graphite film were produced by an entirely similar method to Example B1 except that the vessel F was used in place of the vessel A. The results of the presence or absence of ruffling and fusion of the obtained carbonaceous film, and the presence or absence of wrinkle of the finally obtained graphite film are summarized in Table 5.

In Example B6, although ruffling of the surface of the carbonaceous film was completely absent, there was a part having slightly fused film surfaces. The extent of this fusion was not so great as to cause fracture of the film, and the film was capable of being applied also to the subsequent graphitization step without problems.

(Production of Vessel G)

With reference to FIG. 5, vessel G was composed of: outer casing 20 having a shape indicated by an internal diameter of 96.6 mm, an external diameter of 106.6 mm, a thickness of 5 mm, and a height of 300 mm; and core 10 having a shape in which disc 15 having a diameter of 97.5 mm and a height of 10 mm was connected at both ends of a circular cylinder having a diameter of 80 mm and a height of 280 mm. In addition, the disc 15 having a diameter of 97.5 mm and a height of 10 mm is provided with several holes having a diameter of 10 mm for ventilation. The outer casing 20 and the core 10 were produced from isotropic graphite in their entirety.

Example B7

As a polymer film, a polyimide film (trade name: Apical 75AH film; thickness: 75 μm) manufactured by Raneka Corporation, having a width of 250 mm was provided. A carbonaceous film and a graphite film were produced by an entirely similar method to Example B1 except that the vessel G was used in place of the vessel A. The results of the presence or absence of ruffling and fusion of the obtained carbonaceous film, and the presence or absence of wrinkle of the finally obtained graphite film are summarized in Table 5.

In Example B7, although ruffling of the surface of the carbonaceous film was completely absent, there was a part having slightly fused film surfaces. The extent of this fusion was not so great as to cause fracture of the film, and the film was capable of being applied also to the subsequent graphitization step without problems.

(Production of Vessel H)

With reference to FIG. 5, vessel H was composed of: outer casing 20 having a shape indicated by an internal diameter of 280 mm, an external diameter of 290 mm, a thickness of 5 mm, and a height of 300 mm; and core 10 having a shape in which disc 15 having a diameter of 280 mm and a height of 10 mm was connected at both ends of a circular cylinder having a diameter of 260 mm and a height of 280 mm. In addition, the disc 15 having a diameter of 280 mm and a height of 10 mm is provided with several holes having a diameter of 10 mm for ventilation. The outer casing 20 and the core 10 were produced from isotropic graphite in their entirety.

Example B8

As a polymer film, a polyimide film (trade name: Apical 75AH film; thickness: 75 μm) manufactured by Kaneka Corporation, having a width of 250 mm was provided. A carbonaceous film and a graphite film were produced by an entirely similar method to Example B1 except that the vessel H was used in place of the vessel A. The results of the presence or absence of ruffling and fusion of the obtained carbonaceous film, and the presence or absence of wrinkle of the finally obtained graphite film are summarized in Table 5.

From the results of Comparative Example B2 and Example B8, it was proven that production of a carbonaceous film without causing ruffling is enabled when a core having the value (b/a) falling within the range of 0.2 or greater and 0.9 or less is selected, even if the outer casing having a particular dimension is used.

(Production of Vessel I)

With reference to FIG. 5, vessel I was composed of: outer casing 20 having a shape indicated by an internal diameter of 380 mm, an external diameter of 390 mm, a thickness of 5 mm, and a height of 300 mm; and core 10 having a shape in which disc 15 having a diameter of 380 mm and a height of 10 mm was connected at both ends of a circular cylinder having a diameter of 80 mm and a height of 280 mm. In addition, the disc 15 having a diameter of 380 mm and a height of 10 mm is provided with several holes having a diameter of 10 mm for ventilation. The outer casing 20 and the core 10 were produced from isotropic graphite in their entirety.

Comparative Example B1

As a polymer film, a polyimide film (trade name: Apical 75AH film; thickness: 75 μm) manufactured by Kaneka Corporation, having a width of 250 mm was provided. A carbonaceous film and a graphite film were produced by an entirely similar method to Example B1 except that the vessel I was used in place of the vessel A. The results of the presence or absence of ruffling and fusion of the obtained carbonaceous film, and the presence or absence of wrinkle of the finally obtained graphite film are summarized in Table 5.

When the carbonization treatment was carried out using the vessel I, a carbonaceous film having a significantly ruffled surface was obtained. In addition, a part of the film was fused. This fusion is believed to result from formation of portions where escape of the gas emitted from the film became inferior due to ruffling of the film. The film significantly ruffled also following the graphitization, and great wrinkles were generated yet also following the compression and flexibilization treatment.

(Production of Vessel J)

With reference to FIG. 5, vessel J was composed of: outer casing 20 having a shape indicated by an internal diameter of 280 mm, an external diameter of 290 mm, a thickness of 5 mm, and a height of 300 mm; and core 10 having a shape in which disc 15 having a diameter of 280 mm and a height of 10 mm was connected at both ends of a circular cylinder having a diameter of 80 mm and a height of 280 mm. In addition, the disc 15 having a diameter of 280 mm and a height of 10 mm is provided with several holes having a diameter of 10 mm for ventilation. The outer casing 20 and the core 10 were produced from isotropic graphite in their entirety.

Comparative Example B2

As a polymer film, a polyimide film (trade name: Apical 75AH film; thickness: 75 μm) manufactured by Kaneka Corporation, having a width of 250 mm was provided. A carbonaceous film and a graphite film were produced by an entirely similar method to Example B1 except that the vessel J was used in place of the vessel A. The results of the presence or absence of ruffling and fusion of the obtained carbonaceous film, and the presence or absence of wrinkle of the finally obtained graphite film are summarized in Table 5.

Similarly to the vessel I, a significantly ruffled carbonaceous film was obtained also when the vessel J was used. Wrinkles were generated also following the compression and flexibilization treatment.

(Production of Vessel K)

With reference to FIG. 5, vessel K was composed of: outer casing 20 having a shape indicated by an internal diameter of 96 mm, an external diameter of 106 min, a thickness of 5 mm, and a height of 300 mm; and core 10 having a shape in which disc 15 having a diameter of 96 mm and a height of 10 mm was connected at both ends of a circular cylinder having a diameter of 80 mm and a height of 280 mm. In addition, the disc 15 having a diameter of 96 mm and a height of 10 mm is provided with several holes having a diameter of 10 mm for ventilation. The outer casing 20 and the core 10 were produced from isotropic graphite in their entirety.

Comparative Example B3

As a polymer film, a polyimide film (trade name: Apical 75AH film; thickness: 75 µm) manufactured by Kaneka Corporation, having a width of 250 mm was provided. A carbonaceous film and a graphite film were produced by an entirely similar method to Example B1 except that the vessel K was used in place of the vessel A. The results of the presence or absence of ruffling and fusion of the obtained carbonaceous film, and the presence or absence of wrinkle of the finally obtained graphite film are summarized in Table 5.

When the vessel K was used, fusion and fracture of the carbonaceous film was caused entirely. In addition, the obtained carbonaceous film significantly ruffled. These events are believed to result from almost absent space in the vessel, and thus the film linearly expanded was ruffled in the vessel. Although the compression and flexibilization treatment was carried out following the graphitization treatment, also wrinkles were generated.

(Production of Vessel L)

With reference to FIG. 5, vessel L was composed of: outer casing 20 having a shape indicated by an internal diameter of 155 mm, an external diameter of 165 mm, a thickness of 5 mm, and a height of 300 mm; and core 10 having a shape in which disc 15 having a diameter of 155 mm and a height of 10 mm was connected at both ends of a circular cylinder having a diameter of 60 mm and a height of 280 mm. In addition, the disc 15 having a diameter of 155 mm and a height of 10 mm is provided with several holes having a diameter of 10 mm for ventilation. The outer casing 20 and the core 10 were produced from isotropic graphite in their entirety.

Comparative Example B4

As a polymer film, a polyimide film (trade name: Apical 75AH film; thickness: 75 µm) manufactured by Kaneka Corporation, having a width of 250 mm was provided. A carbonaceous film and a graphite film were produced by an entirely similar method to Example B1 except that the vessel L was used in place of the vessel A. The results of the presence or absence of ruffling and fusion of the obtained carbonaceous film, and the presence or absence of wrinkle of the finally obtained graphite film are summarized in Table 5.

From the results of Example B1 and Comparative Example B4, it was proven that the carbonaceous film is ruffled when a core having the value (b/a) of smaller than 0.2 is used even if the outer casing having a particular dimension is used. In addition, when the carbonaceous film was produced using a core having a diameter of 60 mm, a graphite film accompanied by significant peculiar winding is formed, and many wrinkles were generated during the compression step.

TABLE 5

| | Internal diameter of outer casing mm | Diameter of internal core mm | Thickness of wrapping mm | b/a | Carbonaceous film ruffling | Fusion | Wrinkle following pressing of graphitized film |
|---|---|---|---|---|---|---|---|
| Example B1 | 155 | 80 | 7.5 | 0.20 | a few present | absent | absent |
| Example B2 | 130 | 80 | 7.5 | 0.30 | slightly present | absent | absent |
| Example B3 | 110 | 80 | 7.5 | 0.50 | absent | absent | absent |
| Example B4 | 105 | 80 | 7.5 | 0.60 | absent | absent | absent |
| Example B5 | 100 | 80 | 7.5 | 0.75 | absent | hardly present | absent |
| Example B6 | 98.8 | 80 | 7.5 | 0.80 | absent | a few present | absent |
| Example B7 | 96.6 | 80 | 7.5 | 0.90 | absent | a few present | absent |
| Example B8 | 280 | 260 | 7.5 | 0.75 | absent | hardly present | absent |
| Comparative Example B1 | 380 | 80 | 7.5 | 0.05 | overall ruffling | present | present |
| Comparative Example B2 | 280 | 80 | 7.5 | 0.075 | overall ruffling | absent | present |
| Comparative Example B3 | 96 | 80 | 7.5 | 0.94 | bent and fracture | present | present |
| Comparative Example B4 | 155 | 60 | 7.5 | 0.16 | Significantly ruffling | absent | present |

(Production of Vessel M)

With reference to FIG. 5, vessel M was composed of: outer casing 20 having a shape indicated by an internal diameter of 115 mm, an external diameter of 125 mm, a thickness of 5 mm, and a height of 300 mm; and core 10 having a shape in which disc 15 having a diameter of 115 mm and a height of 10 mm was connected at both ends of a circular cylinder having a diameter of 80 mm and a height of 280 mm. In addition, the disc 15 having a diameter of 115 mm and a height of 10 mm is provided with several holes having a diameter of 10 mm for ventilation. The outer casing 20 and the core 10 were produced from isotropic graphite in their entirety.

Example B9

As a polymer film, a polyimide film (trade name: Apical 75AH film; thickness: 75 μm) manufactured by Kaneka Corporation, having a width of 250 mm was provided. With reference to FIG. 2, this polymer film in a length of 25 m was wrapped around a central region of the core of the vessel M (thickness of wrapping: 6.7 mm), and the core wrapped by the film was placed into an outer casing. The vessel M including thus set film was transversely situated in an electric furnace, and the temperature was elevated from room temperature up to 1,000° C. at a rate of 1° C./min to execute a carbonization treatment. The carbonization treatment was carried out in a nitrogen stream. After cooling to room temperature, the obtained carbonaceous film was examined as to whether or not ruffling and fusion are present. Subsequently, the carbonaceous film was placed again into the vessel A, and the temperature was elevated up to 2,900° C. at a rate of 2° C./min to execute a graphitization treatment using a furnace for graphitization. After cooling to room temperature, a part of the graphite film subjected to the heat treatment was cut to give a square of x 200 mm, and the surface state thereof was examined. Thereafter, the square piece of the heat-treated graphite film was sandwiched with polymer films having a length of 250 mm, a width of 250 mm and a thickness of 125 μm from above and below. Then, a subsequent flatwise compressing step was carried out using a compression molding machine. The pressure applied was 10 MPa. The finally obtained graphite film was examined as to whether or not wrinkles are present. The results are summarized in Table 6.

Example B10

A carbonaceous film and a graphite film were produced by an entirely similar method to Example B9 except that Apical 75AH film in a length of 30 m was wrapped around the central region of the core of the vessel M (thickness of wrapping: 8.1 mm). The results of the presence or absence of ruffling and fusion of the obtained carbonaceous film, and the presence or absence of wrinkle of the finally obtained graphite film are summarized in Table 6.

Example B11

A carbonaceous film and a graphite film were produced by an entirely similar method to Example B7 except that Apical 75AH film in a length of 40 m was wrapped around the central region of the core of the vessel M (thickness of wrapping: 10.5 mm). The results of the presence or absence of ruffling and fusion of the obtained carbonaceous film, and the presence or absence of wrinkle of the finally obtained graphite film are summarized in Table 6.

Example B12

A carbonaceous film and a graphite film were produced by an entirely similar method to Example B9 except that Apical 75AH film in a length of 50 m was wrapped around the central region of the core of the vessel M (thickness of wrapping: 12.8 mm). The results of the presence or absence of ruffling and fusion of the obtained carbonaceous film, and the presence or absence of wrinkle of the finally obtained graphite film are summarized in Table 6.

Example B13

A carbonaceous film and a graphite film were produced by an entirely similar method to Example B9 except that Apical 75AH film in a length of 60 m was wrapped around the central region of the core of the vessel M (thickness of wrapping: 15 mm). The results of the presence or absence of ruffling and fusion of the obtained carbonaceous film, and the presence or absence of wrinkle of the finally obtained graphite film are summarized in Table 6.

A carbonaceous film having a favorable surface was successfully obtained without occurrence of ruffling even if the number of times of wrapping if the polyimide film increased, when the value (b/a) fell in the range of 0.2 or greater and 0.9 or less. In Example B13, fusion of a part of the obtained carbonaceous film occurred; however, the extent of this fusion was not so great as to cause fracture of the film.

Example B14

A carbonaceous film and a graphite film were produced by an entirely similar method to Example B10 except that the vessel M was set to vertically situate in the electric furnace. The results of the presence or absence of ruffling and fusion of the obtained carbonaceous film, and the presence or absence of wrinkle of the finally obtained graphite film are summarized in Table 6.

A carbonaceous film having a ruffled surface was obtained as compared with Example B10, when the vessel was vertically situated and the carbonization treatment was carried out. In addition, fusion of a part of the film occurred. In a best mode for the practice of the present invention, the better setting of the vessel is transversely situated setting than vertically situated setting.

Example B15

Figure 6:
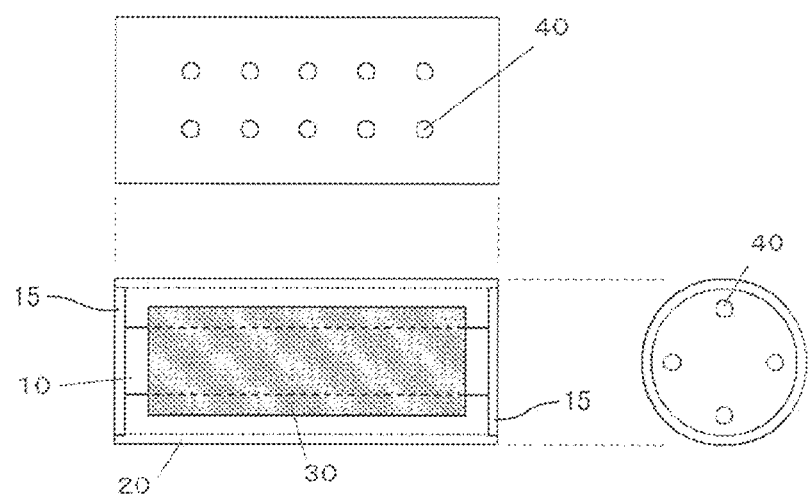
FIG. 6 shows a schematic view illustrating still other example of a vessel and a material film according to the present invention.

With reference to FIG. 6, a carbonaceous film and a graphite film were produced by an entirely similar method to Example B13 except that the outer casing 20 of the vessel M were provided with several holes having a diameter of 2 mm for ventilation in the upper half area of the vessel. The results of the presence or absence of ruffling and fusion of the obtained carbonaceous film, and the presence or absence of wrinkle of the finally obtained graphite film are summarized in Table 6.

By providing the outer casing 20 with the holes for ventilation, remedy of the fusion was accomplished. The surface of the obtained carbonaceous film had no trace of the holes for ventilation replicated.

Comparative Example B5

A carbonaceous film and a graphite film were produced by an entirely similar method to Example B9 except that Apical 75AH film in a length of 65 m was wrapped around the central region of the core of the vessel M (thickness of wrapping: 16.1 mm). The results of the presence or absence of ruffling and fusion of the obtained carbonaceous film, and the presence or absence of wrinkle of the finally obtained graphite film are summarized in Table 6.

The vessel M resulted in failure in carbonizing the polyimide film in a length of 65 m without causing fusion.

(Production of Vessel N)

With reference to FIG. 5, Vessel N was composed of: outer casing 20 having a shape indicated by an internal diameter of 125 mm, an external diameter of 135 mm, a thickness of 5 mm, and a height of 300 mm; and core 10 having a shape in which disc 15 having a diameter of 125 mm and a height of 10 mm was connected at both ends of a circular cylinder having a diameter of 80 mm and a height of 280 mm. In addition, the disc 15 having a diameter of 125 mm and a height of 10 mm is provided with several holes having a diameter of 10 mm for ventilation. The outer casing 20 and the core 10 were produced from isotropic graphite in their entirety.

Example B16

A carbonaceous film and a graphite film were produced by an entirely similar method to Example B9 except that Apical 75AH film in a length of 65 m was wrapped around the central region of the core of the Vessel N (thickness of wrapping: 16.1 mm). The results of the presence or absence of ruffling and fusion of the obtained carbonaceous film, and the presence or absence of wrinkle of the finally obtained graphite film are summarized in Table 6.

When a vessel including an outer casing having a large internal diameter is used, carbonization without causing fusion was enabled. From the results of Comparative Example B5 and Example B16, it was proven that when a polyimide film having a certain or greater length is subjected to a treatment, designing a vessel which can have an appropriate value (b/a) is necessary.

It is to be noted that even when Apical 75AH (manufactured by Kaneka Corporation; thickness: 75 µm) or polyimide films (trade name: Kapton®H film; thickness: 75 µm and 50 µm) manufactured by Du Pont-Toray Co., Ltd. were used in place of Apical 50AH in these Examples and Comparative Examples (Examples B1 to B16, and Comparative Examples B1 to B5), similar effects were achieved.

was continued from 500° C. to 700° C. without allowing nitrogen to flow while keeping the internal pressure at −0.01 kPa; nitrogen was supplied at 700° C.; and the treatment was carried out up to 1,000° C. at in internal pressure of ±0 kPa. The thickness, the surface condition, and the weight per unit area (g/m2), and the thermal diffusivity after the graphitization treatment of the carbonaceous film are summarized in Table 7. The phrase "internal pressure being −0.01 kPa with vacuum pump" herein referred to means that the internal pressure of the electric furnace is lower than the outside pressure of the electric furnace by 0.01 kPa.

It was revealed that similar effects to Example A1 were achieved also when the pressure was reduced only in the range of carbonization and thermal decomposition. In addition, by switching to pressure reduction in the temperature range of carbonization and thermal decomposition, the gas retained between the film surfaces was pushed out of the system together with nitrogen in the furnace, and thus less fusion occurred than in Example A1.

Example C2

A carbonaceous film was produced by an entirely similar method to Example A1 except that: the temperature elevation was continued in the carbonization treatment atmosphere from room temperature to 700° C. without allowing nitrogen to flow while keeping the internal pressure at −0.01 kPa; nitrogen was supplied at 700° C.; and the treatment was carried out up to 1,000° C. at in internal pressure of 4-0 kPa. The thickness, the surface condition, and the weight per unit area (g/m2), and the thermal diffusivity after the graphitization treatment of the carbonaceous film are summarized in Table 7. The phrase "internal pressure being −0.01 kPa with vacuum pump" herein referred to means that the internal pressure of the electric furnace is lower than the outside pressure of the electric furnace by 0.01 kPa.

By carrying out the heat treatment at an ordinary pressure in the temperature range of 700° C. or more in which

TABLE 6

| | Internal diameter of outer casing mm | Diameter of internal core mm | Thickness of wrapping Mm | b/a | Carbonaceous film ruffling | Fusion | Wrinkle following pressing of graphitized film |
|---|---|---|---|---|---|---|---|
| Example B9 | 115 | 80 | 6.7 | 0.38 | slightly present | absent | absent |
| Example B10 | 115 | 80 | 8.1 | 0.46 | absent | absent | absent |
| Example B11 | 115 | 80 | 10.5 | 0.60 | absent | absent | absent |
| Example B12 | 115 | 80 | 12.8 | 0.73 | absent | hardly present | absent |
| Example B13 | 115 | 80 | 15 | 0.86 | absent | a few present | absent |
| Example B14 | 115 | 80 | 8.1 | 0.46 | present | a few present | a few present |
| Example B15 | 115 | 80 | 15 | 0.86 | absent | absent | absent |
| Example B16 | 125 | 80 | 16.1 | 0.72 | absent | absent | absent |
| Comparative Example B5 | 115 | 80 | 16.1 | 0.92 | absent | present | absent |

Example C1

A carbonaceous film was produced by an entirely similar method to Example A1 except that: the treatment was carried out in the carbonization treatment atmosphere from room temperature to 500° C. in a nitrogen atmosphere (without allowing nitrogen to flow during the heat treatment) at an internal pressure of ±0 kPa; the temperature elevation carbonization and thermal decomposition proceeded and yielded a fragile, the treatment proceeded under mild conditions, whereby a carbonaceous film free from breakage was successfully obtained.

Example C3

A carbonaceous film was produced by an entirely similar method to Example A1 except that: the treatment was carried out in the carbonization treatment atmosphere from room temperature to 500° C. in a nitrogen atmosphere (without allowing nitrogen to flow during the heat treatment) at an internal pressure of ±0 kPa; and the temperature elevation was continued from 500° C. to 1,000° C. without allowing nitrogen to flow while keeping the internal pressure at −0.01 kPa. The thickness, the surface condition, and the weight per unit area (g/m2), and the thermal diffusivity after the graphitization treatment of the carbonaceous film are summarized in Table 7. The phrase "internal pressure being −0.01 kPa with vacuum pump" herein referred to means that the internal pressure of the electric furnace is lower than the outside pressure of the electric furnace by 0.01 kPa.

By switching to pressure reduction in the temperature range of carbonization and thermal decomposition, the gas retained between the film surfaces was pushed out of the system together with nitrogen in the furnace, and thus less fusion occurred than in Example A1.

Example C4

A carbonaceous film was produced by an entirely similar method to Example A1 except that: the treatment was carried out in the carbonization treatment atmosphere from room temperature to 400° C. in a nitrogen atmosphere (without allowing nitrogen to flow during the heat treatment) at an internal pressure of ±0 kPa; the temperature elevation was continued from 400° C. to 800° C. without allowing nitrogen to flow while keeping the internal pressure at −0.01 kPa; nitrogen was supplied at 800° C.; and the treatment was carried out up to 1,000° C. at in internal pressure of ±0 kPa. The thickness, the surface condition, and the weight per unit area (g/m2), and the thermal diffusivity after the graphitization treatment of the carbonaceous film are summarized in Table 7. The phrase "internal pressure being 0.01 kPa with vacuum pump" herein referred to means that the internal pressure of the electric furnace is lower than the outside pressure of the electric furnace by 0.01 kPa.

It was revealed that similar effects to Example A1 were achieved also in the case in which the temperature range of pressure reduction if from 400° C. to 800° C.

Example C5

A carbonaceous film was produced by an entirely similar method to Example A5 except that: the treatment was carried out in the carbonization treatment atmosphere from room temperature to 500° C. in a nitrogen atmosphere (without allowing nitrogen to flow during the heat treatment) at an internal pressure of ±0 kPa; the temperature elevation was continued from 500° C. to 700° C. without allowing nitrogen to flow while keeping the internal pressure at −10 kPa; nitrogen was supplied at 700° C.; and the treatment was carried out up to 1,000° C. at in internal pressure of ±0 kPa. The thickness, the surface condition, and the weight per unit area (g/m2), and the thermal diffusivity after the graphitization treatment of the carbonaceous film are summarized in Table 7. The phrase "internal pressure being −10 kPa with vacuum pump" herein referred to means that the internal pressure of the electric furnace is lower than the outside pressure of the electric furnace by 10 kPa.

By carrying out the heat treatment at an ordinary pressure in the temperature range of 700° C. or more in which carbonization and thermal decomposition proceeded and yielded a fragile, the treatment proceeded under mild conditions, whereby a carbonaceous film free from breakage was successfully obtained.

Example C6

A carbonaceous film was produced by an entirely similar method to Example A6 except that: the treatment was carried out in the carbonization treatment atmosphere from room temperature to 500° C. in a nitrogen atmosphere (without allowing nitrogen to flow during the heat treatment) at an internal pressure of ±0 kPa; the temperature elevation was continued from 500° C. to 700° C. in a nitrogen stream (1.0 L/min) while keeping the internal pressure at −10 kPa; nitrogen was supplied at 700° C.; and the treatment was carried out up to 1,000° C. at in internal pressure of ±0 kPa. The thickness, the surface condition, and the weight per unit area (g/m2), and the thermal diffusivity after the graphitization treatment of the carbonaceous film are summarized in Table 7. The phrase "internal pressure being −10 kPa with vacuum pump" herein referred to means that the internal pressure of the electric furnace is lower than the outside pressure of the electric furnace by 10 kPa.

It was proven that suppression of fusion was enabled even under a vacuum condition in a nitrogen stream by reducing the pressure only in the range of carbonization and thermal decomposition.

Example C7

A carbonaceous film was produced by an entirely similar method to Example A9 except that: the treatment was carried out in the carbonization treatment atmosphere from room temperature to 500° C. in a nitrogen atmosphere (without allowing nitrogen to flow during the heat treatment) at an internal pressure of ±0 kPa; the temperature elevation was continued from 500° C. to 700° C. without allowing nitrogen to flow while keeping the internal pressure at −0.01 kPa; nitrogen was supplied at 700° C.; and the treatment was carried out up to 1,000° C. at in internal pressure of ±0 kPa. The thickness, the surface condition, and the weight per unit area (g/m2), and the thermal diffusivity after the graphitization treatment of the carbonaceous film are summarized in Table 7. The phrase "internal pressure being −0.01 kPa with vacuum pump" herein referred to means that the internal pressure of the electric furnace is lower than the outside pressure of the electric furnace by 0.01 kPa.

Also in the case in which 75AH polyimide film was used, suppression of fusion and breakage was enabled similarly to the case in which 50AH polyimide film was used.

Example C8

A carbonaceous film was produced by an entirely similar method to Example A13 except that: the treatment was carried out in the carbonization treatment atmosphere from room temperature to 500° C. in a nitrogen atmosphere (without allowing nitrogen to flow during the heat treatment) at an internal pressure of ±0 kPa; the temperature elevation was continued from 500° C. to 700° C. without allowing nitrogen to flow while keeping the internal pressure at −10 kPa; nitrogen was supplied at 700° C.; and the treatment was carried out up to 1,000° C. at in internal pressure of ±0 kPa. The thickness, the surface condition, and the weight per unit area (g/m2), and the thermal diffusivity after the graphitization treatment of the carbonaceous film are summarized in Table 7. The phrase "internal pressure being −10 kPa with vacuum pump" herein referred to means that the internal pressure of the electric furnace is lower than the outside pressure of the electric furnace by 10 kPa.

By carrying out the heat treatment at an ordinary pressure in the temperature range of 700° C. or more in which carbonization and thermal decomposition proceeded and yielded a fragile, the treatment proceeded under mild conditions, whereby a carbonaceous film free from breakage was successfully obtained.

Example C9

A carbonaceous film was produced by an entirely similar method to Example A13 except that: the temperature elevation was continued in the carbonization treatment atmosphere from room temperature to 700° C. without allowing nitrogen to flow while keeping the internal pressure at −10 kPa; nitrogen was supplied at 700° C.; and the treatment was carried out up to 1,000° C. at in internal pressure of ±0 kPa. The thickness, the surface condition, and the weight per unit area (g/m2), and the thermal diffusivity after the graphitization treatment of the carbonaceous film are summarized in Table 7. The phrase "internal pressure being −10 kPa with vacuum pump" herein referred to means that the internal pressure of the electric furnace is lower than the outside pressure of the electric furnace by 10 kPa.

Since the temperature range of pressure reduction was broader than that in Example C8, the degree of breakage was somewhat greater than that in Example C8 but was less than that in Example A13.

Example C10

A carbonaceous film was produced by an entirely similar method to Example A13 except that: the treatment was carried out in the carbonization treatment atmosphere from room temperature to 500° C. in a nitrogen atmosphere (without allowing nitrogen to flow during the heat treatment) at an internal pressure of ±0 kPa; and the temperature elevation was continued from 500° C. to 1,000° C. without allowing nitrogen to flow while keeping the internal pressure at −10 kPa. The thickness, the surface condition, and the weight per unit area (g/m2), and the thermal diffusivity after the graphitization treatment of the carbonaceous film are summarized in Table 7. The phrase "internal pressure being −10 kPa with vacuum pump" herein referred to means that the internal pressure of the electric furnace is lower than the outside pressure of the electric furnace by 10 kPa.

By switching to pressure reduction in the temperature range of carbonization and thermal decomposition, the gas retained between the film surfaces was pushed out of the system together with nitrogen in the furnace, and thus less fusion occurred than in Example A13. The degree of breakage was somewhat greater tan that those in Examples C8 and C9 since the temperature range of pressure reduction was up to 1,000° C., which was a higher temperature over the temperature range of carbonization and decomposition.

Example C11

A carbonaceous film was produced by an entirely similar method to Example A13 except that: the treatment was carried out in the carbonization treatment atmosphere from room temperature to 400° C. in a nitrogen atmosphere (without allowing nitrogen to flow during the heat treatment) at an internal pressure of ±0 kPa; the temperature elevation was continued from 400° C. to 800° C. without allowing nitrogen to flow while keeping the internal pressure at −10 kPa; nitrogen was supplied at 800° C.; and the treatment was carried out up to 1,000° C. at in internal pressure of ±0 kPa. The thickness, the surface condition, and the weight per unit area (g/m2), and the thermal diffusivity after the graphitization treatment of the carbonaceous film are summarized in Table 7. The phrase "internal pressure being −10 kPa with vacuum pump" herein referred to means that the internal pressure of the electric furnace is lower than the outside pressure of the electric furnace by 10 kPa.

Remedy of both breakage and fusion was permitted as compared with Example A13 even under the reduced pressure in the temperature range of from 400° C. to 800° C.

Example C12

A carbonaceous film was produced by an entirely similar method to Example A14 except that: the treatment was carried out in the carbonization treatment atmosphere from room temperature to 500° C. in a nitrogen atmosphere (without allowing nitrogen to flow during the heat treatment) at an internal pressure of ±0 kPa; the temperature elevation was continued from 500° C. to 700° C. in a nitrogen stream (1.0 L/min) while keeping the internal pressure at −10 kPa; nitrogen was supplied at 700° C.; and the treatment was carried out up to 1,000° C. at in internal pressure of ±0 kPa. The thickness, the surface condition, and the weight per unit area (g/m2), and the thermal diffusivity after the graphitization treatment of the carbonaceous film are summarized in Table 7. The phrase "internal pressure being −10 kPa with vacuum pump" herein referred to means that the internal pressure of the electric furnace is lower than the outside pressure of the electric furnace by 10 kPa.

It was proven that suppression of fusion was enabled similarly to Example A14 even under a vacuum condition in a nitrogen stream by reducing the pressure only in the range of carbonization and thermal decomposition.

Example C13

A carbonaceous film was produced by an entirely similar method to Example A20 except that: the treatment was carried out in the carbonization treatment atmosphere from room temperature to 500° C. in a nitrogen atmosphere (without allowing nitrogen to flow during the heat treatment) at an internal pressure of ±0 kPa; the temperature elevation was continued from 500° C. to 700° C. in a nitrogen stream (1.0 L/min) while keeping the internal pressure at −1 kPa; nitrogen was supplied at 700° C.; and the treatment was carried out up to 1,000° C. at in internal pressure of ±0 kPa. The thickness, the surface condition, and the weight per unit area (g/m2), and the thermal diffusivity after the graphitization treatment of the carbonaceous film are summarized in Table 7. The phrase "internal pressure being −1 kPa with vacuum pump" herein referred to means that the internal pressure of the electric furnace is lower than the outside pressure of the electric furnace by 1 kPa.

By switching to pressure reduction in the temperature range of carbonization and thermal decomposition, the gas retained between the film surfaces was pushed out of the system together with nitrogen in the furnace, and thus less fusion occurred than in Example A20. In addition, remedy of the degree of breakage was also was permitted as compared with Example A20 by reducing the pressure only in the temperature range of carbonization and decomposition.

Example C14

A carbonaceous film was produced by a similar method to Example C13 except that the vessel d was used. The thickness, the surface condition, and the weight per unit area (g/m2), and the thermal diffusivity after the graphitization treatment of the carbonaceous film are summarized in Table 7.

By using a vessel having a larger internal diameter as compared with Example C13, suppression of retention of decomposition gas was enabled, and carbonization without fusion was successfully executed. In addition, no breakage was found. These events are believed to result from achievement of avoiding excessive contact of the film with the outer casing.

Example C15

A carbonaceous film was produced by an entirely similar method to Example A28 except that: the treatment was carried out in the carbonization treatment atmosphere from room temperature to 500° C. in a nitrogen atmosphere (without allowing nitrogen to flow during the heat treatment) at an internal pressure of ±0 kPa; the temperature elevation was continued from 500° C. to 700° C. in a nitrogen stream (1.0 L/min) while keeping the internal pressure at −1 kPa; nitrogen was supplied at 700° C.; and the treatment was carried out up to 1,000° C. at in internal pressure of ±0 kPa. The thickness, the surface condition, and the weight per unit area (g/m2), and the thermal diffusivity after the graphitization treatment of the carbonaceous film are summarized in Table 7. The phrase "internal pressure being −1 kPa with vacuum pump" herein referred to means that the internal pressure of the electric furnace is lower than the outside pressure of the electric furnace by 1 kPa.

By switching to pressure reduction in the temperature range of carbonization and thermal decomposition, the gas retained between the film surfaces was pushed out of the system together with nitrogen in the furnace, and thus less fusion occurred than in Example A28. In addition, remedy of the degree of breakage was also was permitted as compared with Example A28 by reducing the pressure only in the temperature range of carbonization and decomposition.

(Production of Vessel e)

With reference to FIG. 1, vessel e was composed of: outer casing 20 having a shape obtained by cutting out to remove a circular cylindrical shape having a diameter of 160 mm and a height of 300 mm from a rectangular solid (columnar body) having a length of 190 mm, a width of 190 mm and a height of 300 mm; and core 10 having a shape in which disc 15 having a diameter of 160 mm and a thickness of 10 mm was connected at both ends of a circular cylinder having a diameter of 100 mm and a height of 280 mm. In addition, the disc 15 having a diameter of 160 mm and a thickness of 10 mm is provided with several holes having a diameter of 10 mm for ventilation. The outer casing 20 and the core 10 were produced from isotropic graphite in their entirety.

Example C16

A carbonaceous film was produced by a similar method to Example C15 except that the vessel e was used. The thickness, the surface condition, and the weight per unit area (g/m2), and the thermal diffusivity after the graphitization treatment of the carbonaceous film are summarized in Table 7.

By using a vessel having a larger internal diameter as compared with Example C15, suppression of retention of decomposition gas was enabled, and carbonization without fusion was successfully executed. In addition, no breakage was found.

TABLE 7

| | Carbonization atmosphere | | | Vessel | | | | | | Carbonaceous firm | | | | Graphitized film | Stain in furnace |
|---|---|---|---|---|---|---|---|---|---|---|---|---|---|---|---|
| | Internal pressure of furnace | Temperature condition for pressure reduction | Flow rate of nitrogen | V/V1 | Internal diameter of the outer casing [mm] | Diameter of internal core [mm] | Material thickness [mm] | Number of times of wrapping | Thickness of wrapping [mm] | b/a | Thickness [μm] | Weight per unit area [g/m2] | Fusion | Breakage | Thermal diffusivity [cm2/s] | |
| Example A1 | −0.01 kPa | R.T. to 1,000° C. | — | — | 120 | 100 | 0.05 | 50 | 2.5 | 0.25 | 41 | 70 | a few present | slightly present | 8.2 | a few present |
| Example C1 | −0.01 kPa | 500° C. to 700° C. | — | — | 120 | 100 | 0.05 | 50 | 2.5 | 0.25 | 41 | 70 | absent | Absent | 8.2 | a few present |
| Example C2 | −0.01 kPa | R.T. to 700° C. | — | — | 120 | 100 | 0.05 | 50 | 2.5 | 0.25 | 41 | 70 | a few present | absent | 8.2 | a few present |
| Example C3 | −0.01 kPa | 500° C. to 1,000° C. | — | — | 120 | 100 | 0.05 | 50 | 2.5 | 0.25 | 41 | 70 | slightly present | slightly present | 8.2 | a few present |
| Example C4 | −0.01 kPa | 400° C. to 800° C. | — | — | 120 | 100 | 0.05 | 50 | 2.5 | 0.25 | 41 | 70 | slightly present | slightly present | 8.2 | a few present |
| Example A5 | −10 kPa | R.T. to 1,000° C. | — | — | 120 | 100 | 0.05 | 50 | 2.5 | 0.25 | 41 | 70 | absent | a few present | 8.2 | a few present |
| Example C5 | −10 kPa | 500° C. to 700° C. | — | — | 120 | 100 | 0.05 | 50 | 2.5 | 0.25 | 41 | 70 | absent | absent | 8.2 | a few present |
| Example A6 | −10 kPa | R.T. to 1,000° C. | 1.0 | 6.8 | 120 | 100 | 0.05 | 50 | 2.5 | 0.25 | 41 | 70 | absent | a few present | 8.2 | absent |
| Example C6 | −10 kPa | 500° C. to 700° C. | 1.0 | 6.8 | 120 | 100 | 0.05 | 50 | 2.5 | 0.25 | 41 | 70 | absent | absent | 8.2 | absent |
| Example A9 | −0.01 kPa | R.T. to 1,000° C. | — | — | 120 | 100 | 0.05 | 75 | 3.75 | 0.38 | 63 | 91 | somewhat a lot present | absent | 8.2 | a few present |
| Example C7 | −0.01 kPa | 500° C. to 700° C. | — | — | 120 | 100 | 0.05 | 75 | 3.75 | 0.38 | 63 | 91 | a few present | absent | 8.2 | a few present |
| Example A13 | −10 kPa | R.T. to 1,000° C. | — | — | 120 | 100 | 0.05 | 75 | 3.75 | 0.38 | 63 | 91 | a few present | absent | 8.2 | a few present |
| Example C8 | −10 kPa | 500° C. to 700° C. | — | — | 120 | 100 | 0.05 | 75 | 3.75 | 0.38 | 63 | 91 | a few present | slightly present | 8.2 | a few present |
| Example C9 | −10 kPa | R.T. to 700° C. | — | — | 120 | 100 | 0.05 | 75 | 3.75 | 0.38 | 63 | 91 | a few present | a few present | 8.2 | a few present |
| Example C10 | −10 kPa | 500° C. to 1,000° C. | — | — | 120 | 100 | 0.05 | 75 | 3.75 | 0.38 | 63 | 91 | slightly present | slightly present | 8.2 | a few present |
| Example C11 | −10 kPa | 400° C. to 800° C. | — | — | 120 | 100 | 0.05 | 75 | 3.75 | 0.38 | 63 | 91 | slightly present | slightly present | 8.2 | a few present |
| Example A14 | −10 kPa | R.T. to 1,000° C. | 1.0 | 6.8 | 120 | 100 | 0.05 | 75 | 3.75 | 0.38 | 63 | 91 | absent | a few present | 8.2 | absent |
| Example C12 | −10 kPa | 500° C. to 1,000° C. | 1.0 | 6.8 | 120 | 100 | 0.05 | 75 | 3.75 | 0.38 | 63 | 91 | absent | absent | 8.2 | absent |
| Example A20 | −1 kPa | R.T. to 1,000° C. | 1.0 | 6.8 | 125 | 100 | 0.05 | 200 | 10 | 0.80 | 41 | 70 | a few present | a few present | 8.2 | absent |
| Example C13 | −1 kPa | 500° C. to 700° C. | 1.0 | 6.8 | 125 | 100 | 0.05 | 200 | 10 | 0.80 | 41 | 70 | slightly present | slightly present | 8.2 | absent |
| Example C14 | −1 kPa | 500° C. to 700° C. | 1.0 | 6.8 | 140 | 100 | 0.05 | 200 | 10 | 0.50 | 41 | 70 | absent | absent | 8.2 | absent |
| Example A28 | −1 kPa | R.T. to 1,000° C. | 1.0 | 6.8 | 140 | 100 | 0.075 | 200 | 15 | 0.75 | 63 | 91 | a lot present | a few present | 8.2 | absent |
| Example C15 | −1 kPa | 500° C. to 700° C. | 1.0 | 6.8 | 140 | 100 | 0.075 | 200 | 15 | 0.75 | 63 | 91 | slightly present | slightly present | 8.2 | absent |
| Example C16 | −1 kPa | 500° C. to 700° C. | 1.0 | 6.8 | 160 | 100 | 0.075 | 200 | 15 | 0.50 | 63 | 91 | absent | absent | 8.2 | absent |

* R.T.: room temperature

Example A34

A carbonaceous film was produced by a similar method to Example A13 except that the outer casing was not provided. The thickness, the surface condition, and the weight per unit area (g/m2), and the thermal diffusivity after the graphitization treatment of the carbonaceous film are summarized in Table 8.

Since the pressure reduction treatment was carried out, the fusion was comparable to A13. However, since the outer casing was not provided, a ruffled film accompanied by significant breakage was obtained due to the absence of the constraining means of the outer circumferential end of the film. Also in regard to the film following graphitization, ruffling of the resultant carbonaceous film remained, and the compression treatment failed to resolve the ruffling, and also additional wrinkles were generated.

TABLE 8

|  | Internal diameter of outer casing mm | Diameter of internal core mm | Thickness of wrapping mm | b/a | Carbonization atmosphere (~1,000° C.) | | V/V1 | Fusion | Ruffling | Breakage | Wrinkle following pressing of graphitized film |
|---|---|---|---|---|---|---|---|---|---|---|---|
|  |  |  |  |  | Internal pressure of furnace | Flow rate of nitrogen |  |  |  |  |  |
| Example A13 | 120 | 100 | 3.75 | 0.38 | −10 kPa | — | — | a few present | slightly present | a few present | absent |
| Example A34 | — | — | 3.75 | — | −10 kPa | — | — | a few present | overall ruffling | a few present | present |

Embodiments and Examples disclosed herein are presented for illustrative purposes in all aspects and should not be construed as limiting. The scope of the present invention is defined not by the foregoing description but by claims, and equivalent matter to claims and any modifications within the scope of claims are intended to be included.

INDUSTRIAL APPLICABILITY

According to the present invention, a carbonaceous film which can be used in production of a graphite film that is usable as a heat dissipation member in electronic equipments, precision equipments and the like; therefore, the present invention is applicable in the field of electronic parts and the like.

EXPLANATION OF THE REFERENCE SYMBOLS

10 core
15 disc
20 outer casing
30 film
40 ventilation hole
50 heater
55 inner case
60 table
65 gas supply hole
70 pressure reduction opening
81 ring member
82 rod-shaped member

The invention claimed is:

1. A method for producing a carbonaceous film, the method comprising a carbonization step in which a polymer film is subjected to a heat treatment under the condition that the polymer film is wrapped around a core, wherein a vessel comprises the core and an outer casing and at least a part of the outer casing is provided with one or more holes for ventilation.

2. The method for producing a carbonaceous film according to claim 1, wherein the outer casing constrains the outer circumferential end of the polymer film upon expansion and shrinkage of the polymer film in the carbonization step.

3. The method for producing a carbonaceous film according to claim 1, wherein
the core has an outer diameter and the outer casing has an internal diameter; and
the core and the outer casing are configured so that a value (b/a) falls within the range of from 0.2 to 0.9, wherein
"a" is a value in millimeters of the distance between the core and the outer casing, which is (determined by i) subtracting the diameter of the core from the internal diameter of the outer casing to obtain a Diameter Difference Value, and ii) dividing this Diameter Difference Value by 2, and
"b" is a value in millimeters of a thickness of wrapping of the polymer film.

4. The method for producing a carbonaceous film according to claim 1, wherein at least a part of the carbonization step is carried out under a reduced pressure.

5. The method for producing a carbonaceous film according to claim 3, wherein the value (b/a) falls within the range of from 0.5 to 0.8.

6. The method for producing a carbonaceous film according to claim 3, wherein the value (b/a) falls within the range of from 0.3 to 0.7.

7. The method for producing a carbonaceous film according to claim 1, wherein the outer casing has a structure obtained by cutting out to remove a circular cylindrical shape from a columnar body.

8. The method for producing a carbonaceous film according to claim 1, wherein the polymer film is subjected to a heat treatment with the core being transversely situated.

9. The method for producing a carbonaceous film according to claim 1, wherein the polymer film has a thickness of 10 μm or more and 250 μm or less.

10. The method for producing a carbonaceous film according to claim 1, wherein the polymer film has a length of 10 m or more.

11. The method for producing a carbonaceous film according to claim 1, wherein the diameter of the core is 70 mm or more.

12. The method for producing a carbonaceous film according to claim 1, wherein only one type of a polymer film is used without using a separator film.

13. The method for producing a carbonaceous film according to claim 4, wherein the reduced pressure ranges from −0.01 kPa to −0.08 MPa.

14. The method for producing a carbonaceous film according to claim 1, wherein an indirect heat treatment is carried out by maintaining the polymer film wrapped around the core in a heater.

15. The method for producing a carbonaceous film according to claim 1, wherein the area of each hole for ventilation is 20 mm$^2$ or less.

16. The method for producing a carbonaceous film according to claim 1, wherein the area of each hole for ventilation is 10 mm$^2$ or less.

17. The method for producing a carbonaceous film according to claim 1, wherein the area of each hole for ventilation is 5 mm$^2$ or less.

18. The method for producing a carbonaceous film according to claim 1, wherein the shape of each hole for ventilation is circular.

* * * * *